United States Patent [19]
Mizuno et al.

[11] 4,131,035
[45] Dec. 26, 1978

[54] HYDROMECHANICAL TRANSMISSION

[75] Inventors: Kiyohumi Mizuno, Nagoya; Hiroaki Maeda, Toyota; Shigeo Takahashi, Chiryu; Tsukasa Watanabe, Toyota, all of Japan

[73] Assignee: Aisin Seiki Kabushiki Kaisha, Aichi, Japan

[21] Appl. No.: 789,739

[22] Filed: Apr. 21, 1977

[30] Foreign Application Priority Data

Apr. 23, 1976 [JP] Japan .................................. 51-46752

[51] Int. Cl.² .............................................. B60K 41/04
[52] U.S. Cl. ...................................................... 74/866
[58] Field of Search ................ 74/866, 867, 868, 856, 74/857

[56] References Cited
U.S. PATENT DOCUMENTS 3,665,787  5/1972  Wilkinson ......................... 74/857 X Primary Examiner—Benjamin W. Wyche
Assistant Examiner—Frank H. McKenzie, Jr.
Attorney, Agent, or Firm—Oblon, Fisher, Spivak, McClelland & Maier

[57] ABSTRACT

In a hydromechanical transmission, low and high range clutches are selectively operated in response to variation of an actual speed ratio between an input shaft and an output shaft to complete low or high speed drive power train. The transmission comprises a speed ratio detecting valve for detecting lower and higher limits of a predetermined speed ratio and a clutch control valve for selectively operating the low and high range clutches when the actual speed ratio reaches in a range defined by the lower and higher limits of the predetermined speed ratio. The operation of the clutch control valve is controlled by a pressure control valve in accordance with a difference in value between a first signal responsive to a throttle opening angle and a second signal responsive to the rotation speed of the input shaft such that the low and high range clutches are selectively operated only when the difference between the first and second signals becomes a predetermined value.

7 Claims, 16 Drawing Figures

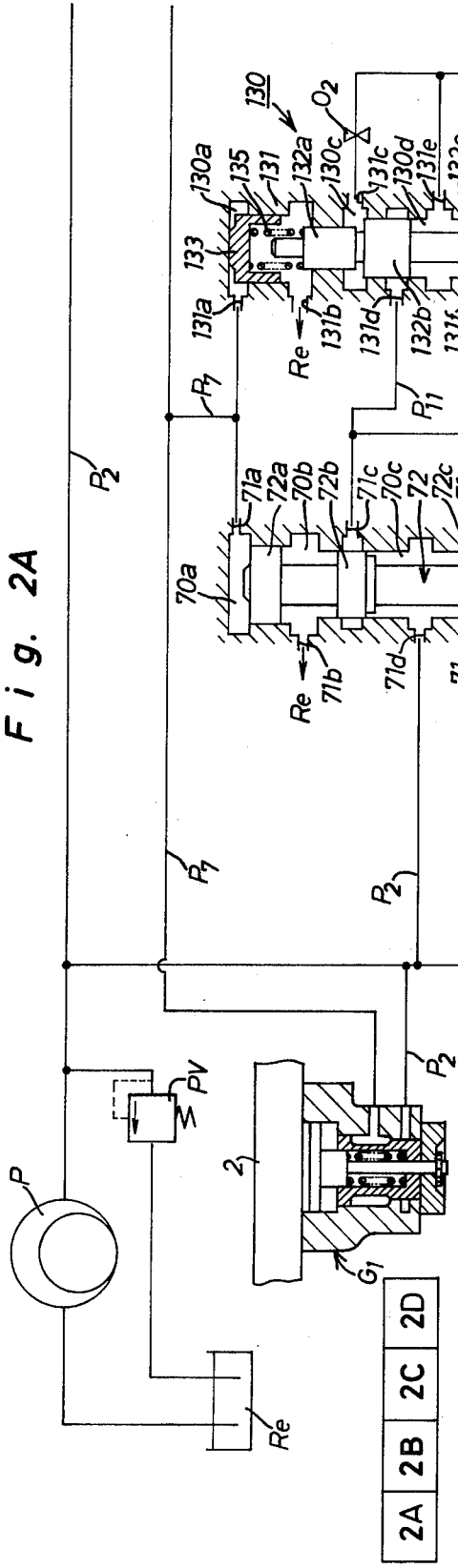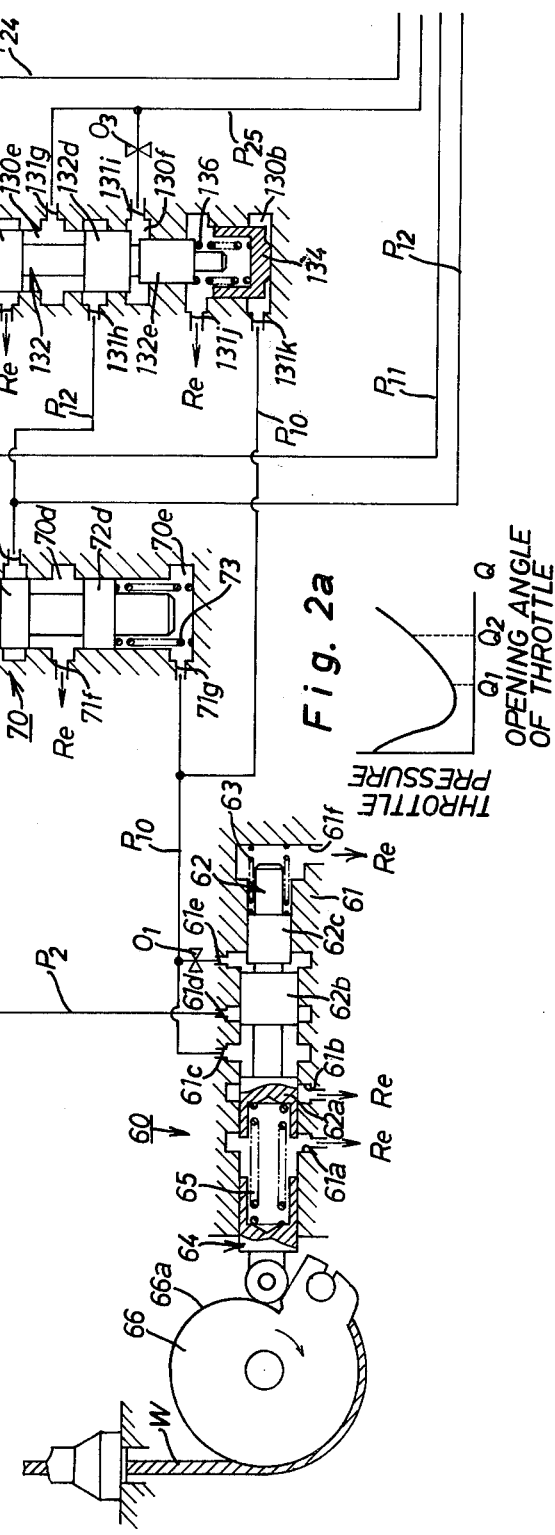

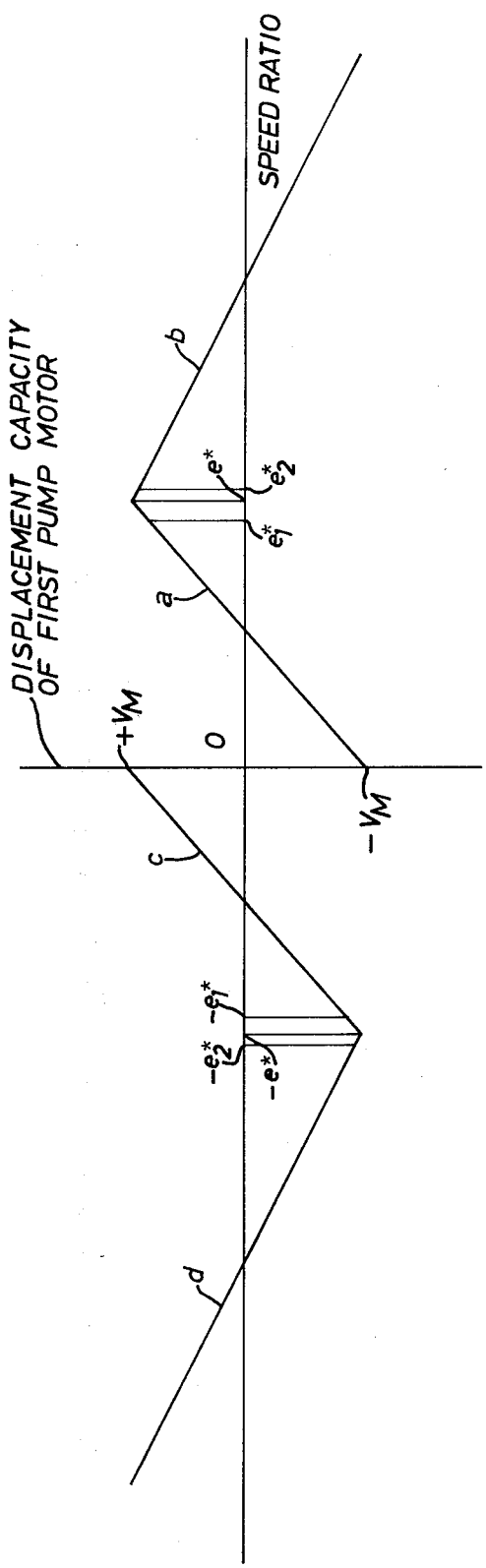

HYDROMECHANICAL TRANSMISSION

BACKGROUND OF THE INVENTION

1. Field of the Invention

The present invention relates to hydromechanical transmissions, and more particularly to an improvement of a hydromechanical transmission of the type wherein low and high speed drive power trains are selectively completed in response to variation of an actual speed ratio between an input shaft and an output shaft.

2. Description of the Prior Art

In conventional hydromechanical transmissions of this kind, the actual speed ratio of the output shaft against the input shaft is controlled in accordance with variation of the displacement ratio of an adjustable positive displacement pump-motor, and the low spped drive power train is switchedover to and from the high speed drive power train when the actual speed ratio reaches a predetermined value. In the pump-motor, however, it is very difficult to eliminate fluid leakage between a cylinder barrel and a valve plate assembled within the pump-motor. Due to the fluid leakage of the pump-motor, the actual speed ratio conducted under control of the pump-motor differs inevitably from the speed ratio figured out in the designing stage. As a result, the switchover between the low and high speed drive power trains may not be surely conducted.

To solve the above-mentioned drawback, in a co-pending U.S. Patent application filed on Feb. 1, 1977, the inventiors have been proposed a hydromechanical transmission wherein speed ratio detecting means is provided to detect lower and higher limits of a predetermined speed ratio and clutch control means to provided to selectively operate the low and high speed range clutches in a range defined by the lower and higher limits of the predetermined speed ratio so as to surely conduct the switchover between the low and high speed drive power trains. In the hydromechanical transmission mentioned above, it is, however, experienced that the low and high range clutches are frequently engaged and disengaged when the actual speed ratio reaches in the predetermined range described above. This causes unpleasant drive feeling and unnecessary wearing of the clutches.

SUMMARY OF THE INVENTION

Accordingly, the present invention is directed to solve the above-mentioned problem and to provide an improved hydromechanical transmission, wherein the operation of the clutch control means is controlled in accordance with a difference in value between a first signal responsive to a throttle opening angle and a second signal responsive to the rotation speed of an input shaft such that the low and high range clutches are selectively operated only when the difference in value between the first and second signals becomes a predetermined value.

In a preferred embodiment of the present invention, there is provided a hydromechanical transmission which comprises an input shaft, an output shaft, a hydraulically controlled differential gear unit for selectively providing low and high speed drive power trains between the input and output shafts, a first positive displacement pump-motor drivingly connected to the input or output shaft, a second positive displacement pump-motor hydraulically connected with the first pump-motor, a fluid actuator for controlling the displacement ratio of the first or second pump-motor, a response valve for controlling line pressure applied to the actuator from a fluid pressure source in accordance with a difference in value between a first signal responsive to a throttle opening angle and a second signal responsive to the rotation speed of the input shaft, low and high range clutch means operated by the line pressure from the fluid pressure source for switching-over the low speed drive power train to and from the high speed drive power train in response to variation of an actual speed ratio of the output shaft against the input shaft, speed ratio detecting means for generating a signal therefrom when the actual speed ratio becomes a predetermined value, clutch control means for selectively operating the low and high range clutch means in response to the signal from the speed ratio detecting means, and means for conducting the operation of the clutch control means such that the low and high range clutch means are selectively operated only when the difference in value between the first and second signals becomes a predetermined value.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is a diagram indicating the relative positions of separated portions of a hydraulic control system depicted in FIGS. 2A, 2B, 2C and 2D, FIG. 2a showing a relation between opening angle of a throttle and throttle pressure;

FIGS. 2A, 2B, 2C and 2D show individually in detail the important portions of the hydraulic control system, when these figures are arranged in the corresponding positions as shwon in FIG. 2, a detailed complete view of the hydraulic control system for the transmission shown in FIG. 1 may be formed up;

FIG. 3 is a graph chart illustrating variation of the speed ratio conducted in the transmission;

DESCRIPTION OF THE PREFERRED EMBODIMENTS

Figure 1:
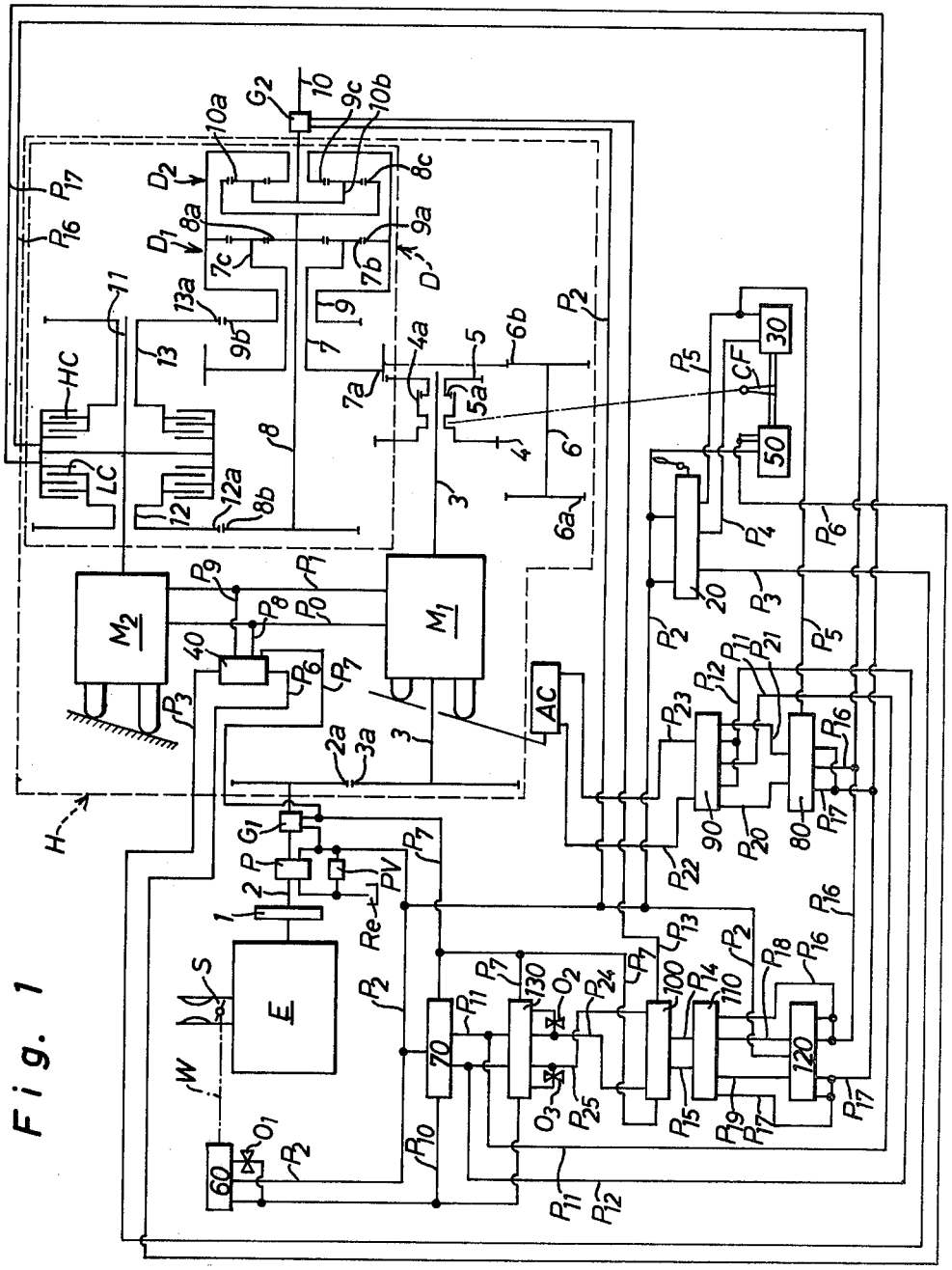
FIG. 1 is a schematic skeleton view showing the whole construction of a hydromechanical transmission in accordance with the present invention.

Referring now to the drawings, particularly in FIG. 1 there is schematically illustrated a preferred embodiment of a hydromechanical transmission in accordance with the present invention. A vehicle engine E is drivingly connected to an input shaft 2 of a hydromechanical transmission H by way of a flywheel 1. Mounted on the transmission input shaft 2 is a fluid pump P for generating line pressure under control of a relief valve PV. A gear 2a fixed on the input shaft 2 is meshed with a gear 3a which is fixed on a driving shaft 3 of a first positive displacement pump-motor $M_1$ of the variable type. A gear 4 is axially slidably splined on the driving shaft 3 and has a dog gear 4a at the right-hand thereof. This gear 4 is moved rightward or leftward by a selector lever CF such that the gear 4 is engaged with a dog gear 5a of a gear 5 at the rightward stroke end thereof and engaged with a left gear 6a fixed on a counter shaft 7 at the leftward stroke end thereof. The gear 5 is journalled on the driving shaft 3 and constantly meshed with a gear 7a of an intermediate shaft 7 which is an input member of a differential gear unit D. A right gear 6b fixed on the counter shaft 6 is also meshed with the gear 7a.

The differential gear unit D comprises first and second planetary gear sets $D_1$ and $D_2$. In the first planetary gear set $D_1$, a sun gear 8a is fixed on a first reaction shaft 8 which has at its left end a gear 8b in mesh with an output gear 12a of a low speed range clutch LC and at its right end a ring gear 8c of the second planetary gear set $D_2$. A ring gear 9a of the first planetary gear set $D_1$ is integrally connected with a second reaction shaft 9 which is rotatably disposed in surrounding relationship to the intermediate shaft 7. The second reaction shaft 9 has at its left end a gear 9b in mesh with an output gear 13a of a high speed range clutch HC and at its right end a sun gear 9c of the second planetary gear set $D_2$. A planetary gear 7b of the first planetary gear set $D_1$ is journalled by a carrier member 7c which is connected to the intermediate shaft 7 rotatable on the first reaction shaft 8. A planetary gear 10a of the second planetary gear set $D_2$ is journalled by a carrier member 10b which is connected to an output shaft 10.

A second positive displacement pump-motor $M_2$ of the fixed type is hydraulically connected to the first pump-motor $M_1$ by way of fluid circuit $P_0$ and $P_1$. The low and high speed range clutches LC and HC are mounted on a rotary shaft 11 of the second pump-motor $M_2$. The low speed range clutch LC includes an output shaft 12 which is rotatably journalled on the rotary shaft 11. When the low range clutch LC is engaged due to hydraulic pressure applied from a fluid circuit $P_{17}$, the output shaft 12 is drivingly connected to the rotary shaft 11. The high speed range clutch HC includes an output shaft 13 which is journalled on the rotary shaft 11. When the high range clutch HC is engaged due to hydraulic pressure applied from a fluid circuit $P_{16}$, the output shaft 13 is drivingly connected to the rotary shaft 11.

In FIG. 3, taking into consideration fluid leakage in the first and second pump-motors $M_1$ $M_2$, a relation between the displacement capacity V of the first pump-motor $M_1$ and the speed ratio e of the output shaft 10 against the input shaft 2 is indicated with characteristic lines a, b, c and d.

Figure 2B:
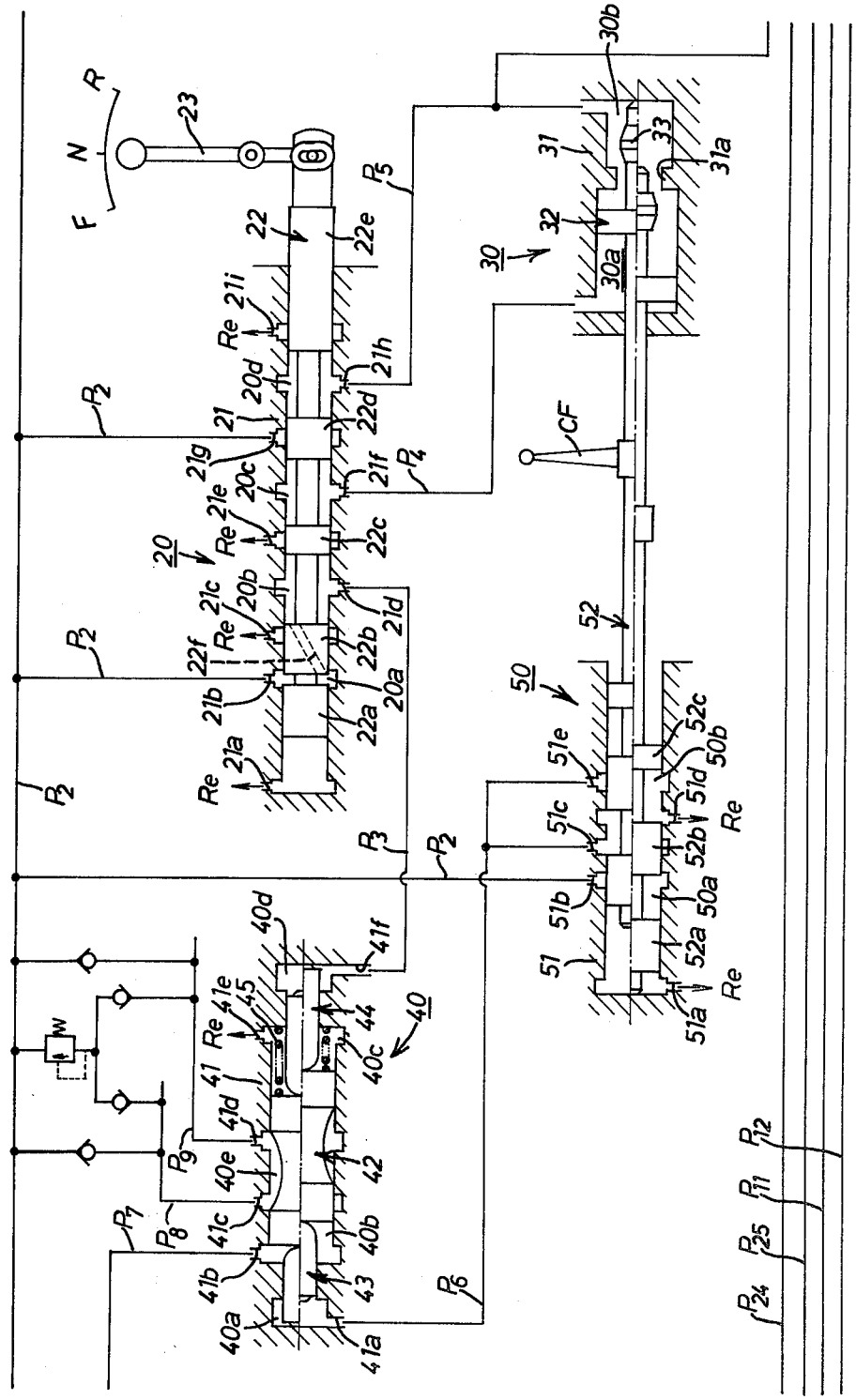
Figure 2C:
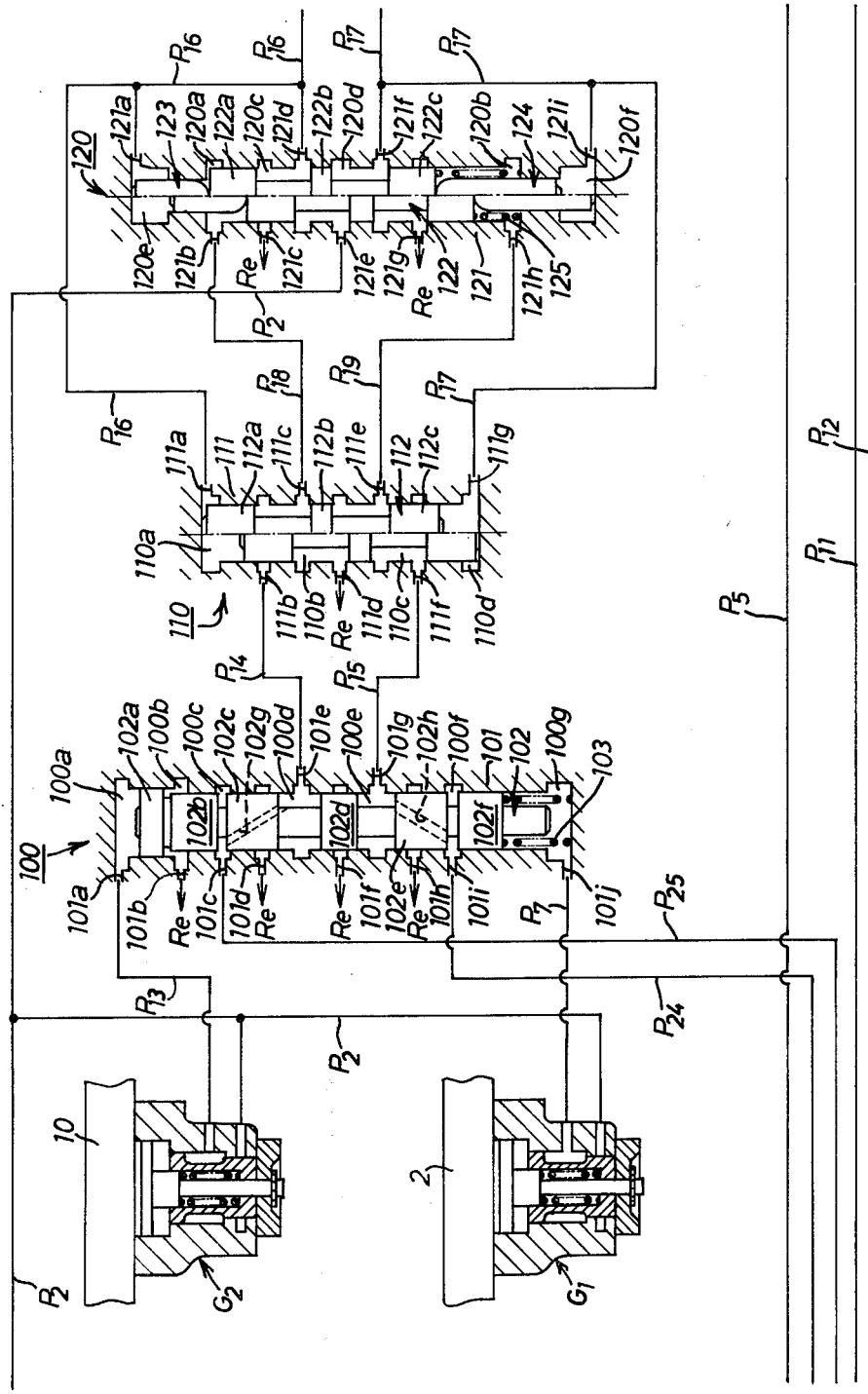
Figure 2D:
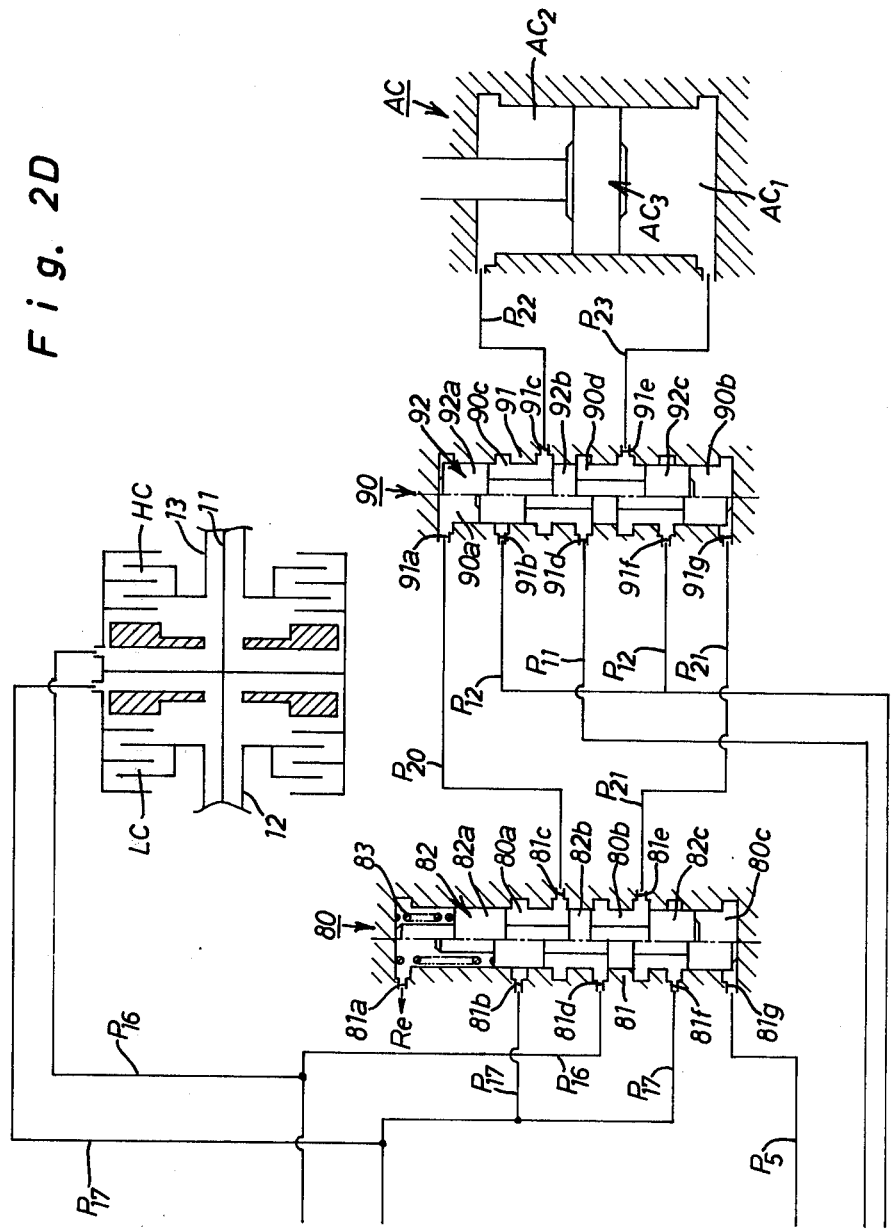

Hereinafter, a hydraulic control system for the hydromechanical transmission H will be described with reference to FIGS. 1 and 2. In FIG. 2 there is illustrated a diagram indicating the relationship of separated portions of the hydraulic control system shown in FIGS. 2A, 2B, 2C and 2D. Particularly with reference to FIG. 2B, a manual shift valve 20 comprises a housing 21, a spool 22 reciprocable within the housing 21 and a shift lever 23 to operate the spool 22, the housing 21 being provided thereon with nine ports 21a to 21i, inclusive. The second and seventh ports 21b and 21g of the housing 21 are connected to the fluid pump P by way of a fluid circuit $P_2$ and the fourth port 21d is connected to a sixth port 41f of a bypass valve 40 by way of a fluid circuit $P_3$. The sixth port 21f of the housing 21 is connected to a left chamber 30a of a fluid actuator 30, which operates the selector lever CF mentioned above, by way of a fluid circuit $P_4$ and the eighth port 21h is connected to a right chamber 30b of the actuator 30 by way of a fluid circuit $P_5$ and also to a seventh port 81g of a switching valve 80 which is illustrated in FIG. 2D. The spool 22 is provided thereon with five lands 22a to 22e, inclusive, which form four annular chambers 20a to 20d within the housing 21. A passage 22f is drilled through the land 22d of the spool 22 to communicate the first chamber 20a with the second chamber 20b.

The shift lever 23 is connected at its lower end with the outer end of the spool 22 to be selectively positioned in its forward, neutral or reverse position F, N or R. While the shift lever 23 is positioned in its neutral position N, as shown in the figure, the fluid circuit $P_2$ opening to the second port 21b is connected to the fourth port 21d across the first chamber 20a, the passage 22f and the second chamber 20b, whereas the fluid circuit $P_2$ opening to the seventh port 21g is closed by the land 22d. When the shift lever 23 is positioned in its forward position F, the fluid circuit $P_2$ opening to the second port 21b is closed by the land 22a and the fluid circuit $P_3$ is connected to a reservoir Re across the port 21d, the second chamber 20b and the port 21e. In this instance, the fluid circuit $P_2$ opening to the seventh port 21g is connected to the fluid circuit $P_4$ across the third chamber 20c and the sixth port 21f and then the fluid circuit $P_5$ is connected to the reservoir Re through the port 21h, the fourth chamber 20d and the port 21i. Furthermore, when the shift lever 23 is positioned in its reverse position R, the fluid circuit $P_2$ to the second port 21b is closed by the land 22b and the fluid circuit $P_3$ is connected to the reservoir Re across the port 21d, the second chamber 20b and the port 21c. In this instance, the fluid circuit $P_2$ to the seventh port 21g is connected to the fluid circuit $P_5$ across the fourth chamber 20d and the port 21h and then the fluid circuit $P_4$ is connected to the reservoir Re across the port 21f, the third chamber 20c and the port 21e.

The fluid actuator 30 has a piston 32 which is fixed on an operation rod 52 of a control valve 50. The piston 32 subdivides the interior of a housing 31 into the right and left chambers 30b and 30a which are connected to the fluid circuits $P_5$ and $P_4$ respectively. Provided within the right chamber 30b is an annular boss 31a projected from the inner wall of the housing 31. This annular boss 31a acts to reduce the moving speed of the operation rod 52 when a head 33 of the operation rod 52 passes through the annular boss 31a.

The bypass valve 40 comprises a housing 41, a spool 42 movable within the housing 41 and a pair of pistons 43 and 44 facing to the opposite ends of the spool 42.

Within the housing 41, first and fourth chambers 40a and 40d are formed by the pistons 43 and 44 and also second, third and fifth chambers 40b, 40c and 40e are formed by the spool 42. The first chamber 40a is connected through a port 41a to a fluid circuit $P_6$ which is connected to ports 51c and 51e of the control valve 50. The second chamber 40b is connected through a port 41b to a fluid circuit $P_7$ which is connected to the governor valve $G_1$, as shown in FIG. 2A. The third chamber 40c is connected to the reservoir Re through a port 41e and the fourth chamber 40d is connected through the port 41f to the fluid circuit $P_3$ which is connected to the fourth port 21d of the manual shift valve 20. Furthermore, the fifth chamber 40e is connected through ports 41c and 41d to fluid circuits $P_8$ and $P_9$ which are connected to the fluid circuits $P_0$ and $P_1$ respectively, as shown in FIG. 1. With this bypass valve 40, the spool 42 is normally biased leftward in the figure by a compression spring 45 disposed within the third chamber 40c. When the line pressure is applied into the first chamber 40a from the fluid circuit $P_6$, the piston 43 is moved against the spring 45 to displace the spool 42 rightward in the figure so that fluid communication between the fluid circuits $P_8$ and $P_9$ is closed by the spool 42. When the line pressure is applied into the fourth chamber 40d to move the piston 44 leftward, the spool 42 is displaced to open the fluid communication between the fluid circuits $P_8$ and $P_9$, as shown in the figure. In this instance, if the fluid pressure in the second chamber 40b exceeds a predetermined one produced by the governor valve $G_1$ under idling operation of the prime engine E, the spool 42 is returned rightward against loading of the spring 45 so that the fluid communication between the fluid circuits $P_8$ and $P_9$ is closed again.

The control valve 50 comprises a housing 51 and a spool which is integrally formed with the operation rod 52. The housing 51 is provided thereon with five ports 51a to 51e, inclusive, and the spool has three lands 52a to 52c, inclusive. With this control valve 50, when the operation rod 52 is positioned in its leftward stroke end, the second land 52b closes fluid communication between the fluid circuits $P_2$ and $P_6$ respectively connected to the second and third ports 51b and 51c, on the other hand the fluid circuit $P_6$ opening to the fifth port 51e is connected to the reservoir Re through a second chamber 50b between the lands 52b and 52c and the fourth port 51d. When the operation rod 52 is positioned in its rightward stroke end, the first land 52a closes the fluid communication between the fluid circuits $P_2$ and $P_6$, on the other hand the fluid circuit $P_6$ is connected to the reservoir Re through the third port 51c, a first chamber 50a between the lands 52a and 52b and the fourth port 51d. During displacement of the operation rod 52, the fluid communication between the fluid circuits $P_2$ and $P_6$ is temporarily conducted across the first chamber 50a.

Reference is made to FIG. 2A, wherein the governor valve $G_1$ is driven by the transmission input shaft 2. The governor valve $G_1$ controls the line pressure from the fluid circuit $P_2$ in proportion to centrifugal force produced in rotation thereof so that the governor pressure is applied to a first port 71a of a speed responsive valve 70, a first port 131a of a pressure control valve 130 and the second port 41b of the bypass valve 40 by way of the fluid circuit $P_7$.

A throttle valve 60 comprises a housing 61, a spool 62 and a piston 64 reciprocable within the housing 61, and a cam plate 66 connected to a throttle S of a carburetor for the engine E by way of a wire W. This throttle valve 60 acts to apply into a fluid circuit $P_{10}$ a throttle pressure which is controlled in accordance with opening degree of the throttle S as described later on. The housing 61 is provided thereon with six ports 61a to 61f, inclusive. The first, second and sixth ports 61a, 61b and 61f are connected to the reservoir Re, the third port 61c is connected to a seventh port 71g of the speed responsive valve 70 and an eleventh port 131k of the pressure control valve 130 by way of the fluid circuit $P_{10}$, the fourth port 61d is connected to the fluid circuit $P_2$, and the fifth port 61e is connected through an orifice $O_1$ to the fluid circuit $P_{10}$. The spool 62 has three lands 62a to 62c and is normally biased leftward in the figure by a compression spring 63. The piston 64 is resiliently engaged at the right end thereof with the spool 62 through a compression spring 65 and engaged at the left end thereof with a cam face 66a of the cam plate 66 in such a manner that the piston 64 is axially pushed by the cam face 66a of the cam plate 66.

With this throttle valve 60, the throttle pressure applied into the fluid circuit $P_{10}$ is controlled in relation to the opening degree of the throttle S as shown in FIG. 2a. That is to say, while the throttling degree $\theta$ takes a small figure, the throttle pressure takes a high figure so that engine braking operation is surely conducted. When the throttling degree $\theta$ takes other figures, the throttle pressure is controlled to correspond with the governor pressure which is producted by the governor value $G_1$ under an engine rotation to generate the maximum power of the engine E.

The speed responsive valve 70 comprises a housing 71 having seven ports 71a to 71g, a spool 72 having four lands 72a to 72d and a compression spring 73 having a predetermined load. In this speed responsive valve 70, a pair of pressure chambers 70a and 70e are formed at the opposite ends of the spool 72 and three annular chambers 70b to 70d are formed by the respective lands 72a to 72d of the spool 72. Thus, the upper pressure chamber 70a is connected to the governor valve $G_1$ by way of the first port 71a and the fluid circuit $P_7$, while the lower pressure chamber 70e is connected to the throttle valve 60 by way of the seventh port 71g and the fluid circuit $P_{10}$. Moreover, the third and fifth ports 71c and 71e are respectively connected to fluid circuits $P_{11}$ and $P_{12}$, the fourth port 71d is connected to the fluid pump P by way of the fluid circuit $P_2$, and the second and sixth ports 71b and 71f are connected to the reservoir Re.

With this speed responsive valve 70, when the engine E is driven at its idling speed or at a speed lower than a predetermined speed defined by movement of the throttle valve 60, the governor pressure in the upper chamber 70a becomes smaller than the throttle pressure in the lower chamber 70e. This moves the spool 72 upward to connect the fluid circuit $P_2$ to the fluid circuit $P_{11}$ and connect the fluid circuit $P_{12}$ to the reservoir Re. When the engine E is driven at a predetermined speed defined by movement of the throttle valve 60, the spool 72 is held in the position shown in the figure so that the fluid circuit $P_2$ is isolated from the fluid circuits $P_{11}$ and $P_{12}$ by means of the lands 72b and 72c of the spool 72. Meanwhile, if the engine E is driven at a speed higher than a predetermined speed defined by movement of the throttle valve 60, the governor pressure becomes larger than the throttle pressure to move the spool 72 downward so that the fluid circuit $P_2$ is connected to the fluid circuit $P_{12}$ and the fluid circuit $P_{11}$ is connected to the reservoir Re.

The pressure control valve 130 is provided to control the line pressure applied to a speed ratio detecting valve 100 in accordance with a difference between the governor pressure and the throttle pressure. The pressure control valve 130 comprises a spool 132 and a pair of pistons 133 and 134 reciprocable within a housing 131 and includes a pair of compression springs 135 and 136 having a predetermined load respectively. The housing 131 is provided thereon with eleven ports 131a to 131k, inclusive. The first port 131a is connected to the governor valve $G_1$ by way of the fluid circuit $P_7$ and the eleventh port 131k is connected to the throttle valve 60 by way of the fluid circuit $P_{10}$. The fourth and eighth ports 131d and 131h are respectively connected to the fluid circuits $P_{11}$ and $P_{12}$. The fifth port 131e is connected to a fluid circuit $P_{24}$ which is connected to a ninth port 101i of the speed ratio detecting valve 100, as shown in FIG. 2c. The seventh port 131g is connected to a fluid circuit $P_{25}$ which is connected to a third port 101c of the valve 100. The third port 131c is connected to the fluid circuit $P_{24}$ through an orifice $O_2$ and the ninth port 131i is connected to the fluid circuit $P_{25}$ through an orifice $O_3$, the remaining ports 131b, 131f and 131j being connected to the reservoir Re. The spool 132 has five lands 132a to 132e and is engaged at the upper end thereof with the upper piston 133 by way of the compression spring 135 which normally urges the spool 132 downward. The spool 132 is also engaged at the bottom end thereof with the lower piston 134 by way of the compression spring 136 which normally urges the spool 132 upward. Within the housing 131, upper and lower pressure chambers 130a and 130b are formed by the upper and lower pistons 133 and 134 respectively, and four annular chambers 130c to 130f are formed by the respective lands 132a to 132e of the spool 132.

In operation of the pressure control valve 130, when the governor pressure in the upper pressure chamber 130a is balanced with the throttle pressure in the lower pressure chamber 130b, the spool 132 is held in the neutral position so that the fluid circuits $P_{11}$ and $P_{12}$ are respectively isolated from the fluid circuits $P_{24}$ and $P_{25}$ by the respective lands 132b and 132d of the spool 132 as shown in the figure. When the governor pressure becomes smaller than the throttle pressure, the spool 132 is moved up to control the line pressure from the fluid circuit $P_{11}$ in accordance with a difference between the governor and throttle pressures so that the controlled line pressure ia applied to the ninth port 101i of the speed ratio detecting valve 100 by way of the fluid circuit $P_{24}$. In the pressure controlling process, when the governor pressure is balanced again with the throttle pressure, the spool 132 is moved down due to fluid pressure applied into the annular chamber 130c from the fluid circuit $P_{24}$ through the orifice $O_2$ so as to connect the fluid circuit $P_{24}$ to the reservoir Re. Conversely when the governor pressure becomes larger than the throttle pressure, the spool 132 is moved down to control the line pressure from the fluid circuit $P_{12}$ in accordance with a difference between the governor and throttle pressures so that the controlled line pressure is applied to the third port 101c of the speed ratio detecting valve 100 by way of the fluid circuit $P_{25}$. In the pressure controlling process, when the governor pressure is balanced again with the throttle pressure, the spool 132 is moved up due to fluid pressure applied into the annular chamber 130f from the fluid circuit $P_{25}$ through the orifice $O_3$ so as to connect the fluid circuit $P_{25}$ to the reservoir Re.

Now reference is made to FIG. 2C of FIG. 2, wherein the speed ratio detecting valve 100 comprises a spool 102 reciprocable within a housing 101 and a compression spring 103 having a predetermined load. The housing 101 is provided thereon with ten ports 101a to 101j, inclusive. The tenth port 101j is connected to the governor valve $G_1$ by way of the fluid circuit $P_7$ and the third and ninth ports 101c and 101i are respectively connected to the fluid circuits $P_{25}$ and $P_{24}$. The first port 101a is connected through a fluid circuit $P_{13}$ to a second governor valve $G_2$ which is mounted on the output shaft 10. The fifth and seventh ports 101e and 101g are respectively connected to fluid circuits $P_{14}$ and $P_{15}$ and the remaining ports 101b, 101d, 101f and 101h are connected to the reservoir Re. The spool 102 has six lands 102a to 102f and is engaged at the bottom end thereof with the spring 103 which normally urges the spool 102 upward. Within the housing 101, a pair of pressure chambers 100a and 100g are formed at the opposite ends of the spool 102 and four annular chambers 100c to 100f are formed by the respective lands 102b to 102f of the spool 102. Thus, the upper chamber 100a is constantly connected to the second governor valve $G_2$ through the fluid circuit $P_{13}$ and the lower chamber 100g is constantly communicated with the governor valve $G_1$ through the fluid circuit $P_7$. Moreover, the annular chambers 100c and 100d are communicated with each other through a passage 102g and the chambers 100e and 100f are also communicated with each other through a passage 102h.

In this speed ratio detecting valve 100, a communication period of the annular chamber 100c against the port 101c is substantially as same as that of the annular chamber 100f against the port 101i, the communication period being determined by the axial width of the respective ports 101c and 101i and the axial width of the respective chamber 100c and 100f. As a result, when the spool 102 is moved due to a difference between two governor pressures appeared in the upper and lower chambers 100a and 100g as shown in the figure, the chamber 100c is communicated with the port 101c to connect the fluid circuit $P_{25}$ to the fluid circuit $P_{14}$ and simultaneously the chamber 100f is communicated with the port 101i to connect the fluid circuit $P_{24}$ to the fluid circuit $P_{15}$. This means the fact that the fluid cricuits $P_{24}$ and $P_{25}$ are respectively connected to the fluid circuits $P_{15}$ and $P_{14}$ while the speed ratio e of the output shaft 10 against the input shaft 2 is maintained in a certain range indicated by reference characters $e_1^*$ and $e_2^*$ in FIG. 3, in which a reference character $e^*$ indicates a predetermined speed ratio where the low and high speed range clutches LC and HC are synchronized.

A speed ratio responsive valve 110 is provided to selectively complete a communication between the fluid circuit $P_{14}$ and a fluid circuit $P_{18}$ or between the fluid circuit $P_{15}$ and a fluid circuit $P_{19}$. This valve 110 comprises a spool 112 reciprocable within a housing 111. The housing 111 is provided thereon with seven ports 111a to 111g, inclusive. The first and seventh ports 111a and 111g are respectively connected to the fluid circuits $P_{16}$ and $P_{17}$ which are connected to the high and low speed range clutches HC and LC respectively. The second and sixth ports 111b and 111f are respectively connected to the fluid circuits $P_{14}$ and $P_{15}$, whereas the third and fifth ports 111c and 111e are respectively connected to the fluid circuits $P_{18}$ and $P_{19}$, the fourth port 111$d$ being connected to the reservoir Re. The spool 112 has three lands 112$a$ to 112$c$ and forms a pair of pressure chambers 110$a$ and 110$d$ at the opposite ends thereof and a pair of annular chambers 110$b$ and 110$c$ between the lands 112$a$ to 112$c$. When the spool 112 is displaced downward by pressure applied to the upper pressure chamber 110$a$, the communication between the fluid circuits $P_{14}$ and $P_{18}$ is blocked by the first land 112$a$, whereas the fluid circuit $P_{15}$ is communicated with the fluid circuit $P_{19}$ across the annular chamber 110$c$. In this instance, the fluid circuit $P_{18}$ is connected to the reservoir Re across the annular chamber 110$b$. When the spool 112 is displaced upward by pressure applied to the lower pressure chamber 110$d$, the communication between the fluid circuits $P_{15}$ and $P_{19}$ is blocked by the third land 112$c$, whereas the fluid circuit $P_{14}$ is communicated with the fluid circuit $P_{18}$ across the annular chamber 110$b$. In this instance, the fluid circuit $P_{19}$ is connected to the reservoir Re across the annular chamber 110$c$.

A clutch control valve 120 is provided to selectively connect the fluid circuit $P_2$ to the fluid circuit $P_{16}$ or $P_{17}$ so as to apply the line pressure from the fluid pump P to the high speed range clutch HC or the low speed range clutch LC. This clutch control valve 120 comprises a spool 122 and a pair of pistons 123 and 124 reciprocable within a housing 121. The housing 121 is provided thereon with nine ports 121$a$ to 121$i$, inclusive. The first and fourth ports 121$a$ and 121$d$ are connected to the fluid circuit $P_{16}$ and the sixth and ninth ports 121$f$ and 121$i$ are connected to the fluid circuit $P_{17}$. The fifth port 131$e$ is also connected to the fluid circuit $P_2$ and the second and eighth ports 121$b$ and 121$h$ are connected to the fluid circuits $P_{18}$ and $P_{19}$ respectively. The spool 122 has three lands 122$a$ to 122$c$ and is engaged at its upper end with the piston 123 and at its lower end with the piston 124 and a return spring 125. Within the housing 121, a pair of pressure chambers 120$a$ and 120$b$ are formed at the opposite ends of the spool 122, two annular chambers 120$c$ and 120$d$ are formed by the respective lands 122$a$ to 122$c$ of the spool 122, and a pair of pressure chambers 120$e$ and 120$f$ are formed by the pistons 123 and 124.

In operation of the clutch control valve 120, when the controlled fluid pressure is applied from the fluid circuits $P_{24}$, $P_{15}$ and $P_{19}$ to the lower pressure chamber 120$b$, the spool 122 is pushed upward in response to the instant value of the controlled fluid pressure to connect the fluid circuit $P_2$ to the fluid circuit $P_{17}$ across the annular chamber 120$d$ and to connect the fluid circuit $P_{16}$ to the reservoir Re across the annular chamber 120$c$. In this instance, the line pressure from the fluid circuit $P_2$ is applied to the lowermost pressure chamber 120$f$ through the fluid circuit $P_{17}$ so that the piston 124 is instantly pushed up to hold the spool 122 in the upward position. When the controlled fluid pressure is applied from the fluid circuits $P_{25}$, $P_{14}$ and $P_{18}$ to the upper pressure chamber 120$a$, the spool 122 is pushed downward against the return spring 125 in response to the instant value of the controlled pressure to connect the fluid circuit $P_2$ to the fluid circuit $P_{16}$ across the annular chamber 120$c$ and to connect the fluid circuit $P_{17}$ to the reservoir Re across the annular chamber 120$d$. In this instance, the line pressure from the fluid circuit $P_2$ is applied to the uppermost pressure chamber 120$e$ through the fluid circuit $P_{16}$ so that the piston 123 is instantly pushed down to hold the spool 122 in the downward position.

Now reference is made to FIG. 2D of FIG. 2, wherein the switching valve 80 is provided to be operated only when the shift lever 23 of the manual shift valve 20 is moved to the reverse position R. This switching valve 80 comprises a spool 82 reciprocable within a housing 81 and a return spring 83 biasing the spool 82 toward the original position thereof. The housing 81 is provided thereon with seven ports 81$a$ to 81$g$, inclusive. The second and sixth ports 81$b$ and 81$f$ are connected to the fluid circuit $P_{17}$ and the fourth port 81$d$ is connected to the fluid circuit $P_{16}$. The third and fifth ports 81$c$ and 81$e$ are respectively connected to fluid circuits $P_{20}$ and $P_{21}$ and the seventh port 81$g$ is connected to the manual shift valve 20 by way of the fluid circuit $P_5$ as mentioned above. The spool 82 has three lands 82$a$ to 82$c$ and is engaged at its upper end with the return spring 83. Within the housing 81, the lower end of the spool 82 is exposed in a pressure chamber 80$c$ in communication to the seventh port 81$g$ and a pair of annular chambers 80$a$ and 80$b$ are formed by the respective lands 82$a$ to 82$c$ of the spool 82.

In operation of the switching valve 80, when the manual shift valve 20 is set in the forward or neutral position F or N, the line pressure from the fluid circuit $P_2$ may not be applied to the pressure chamber 80$c$ so that the spool 82 is held in the original position due to biasing force of the return spring 83. Under this condition, the fluid circuit $P_{16}$ is communicated with the fluid circuit $P_{20}$ across the annular chamber 80$a$ and the fluid circuit $P_{17}$ is communicated with the fluid circuit $P_{21}$ across the second annular chamber 80$b$. When the line pressure from the fluid circuit $P_2$ is applied to the pressure chamber 80$c$ by way of the fluid circuit $P_5$ in response to setting of the manual shift valve 20 to the reverse position R, the spool 82 is moved upward against the biasing force of the spring 83 to communicate the fluid circuit $P_{16}$ to the fluid circuit $P_{21}$ across the second annular chamber 80$b$ and to communicate the fluid circuit $P_{17}$ to the fluid circuit $P_{20}$ across the first annular chamber 80$a$.

A second switching valve 90 is provided to control the line pressure applied to a fluid actuator AC from the fluid circuit $P_{11}$ or $P_{12}$ in accordance with shifting position of the manual shift valve 20 and operating condition of the engaged clutch LC or HC so as to control the displacement ratio of the first pump-motor $M_1$. This second switching valve 90 comprises a spool 92 reciprocable within a housing 91. The housing 91 is provided thereon with seven ports 91$a$ to 91$g$, inclusive. THe first port 91$a$ is connected to the fluid circuit $P_{20}$ and the seventh port 91$g$ is connected to the fluid circuit $P_{21}$. The second and sixth ports 91$b$ and 91$f$ are connected to the fluid circuit $P_{12}$ and the fourth port 91$d$ is connected to the fluid circuit $P_{11}$. Meanwhile, the third and fifth ports 91$c$ and 91$e$ are respectively connected to fluid circuits $P_{22}$ and $P_{23}$. Within the housing 91 a pair of pressure chambers 90$a$ and 90$b$ are formed at the opposite ends of the spool 92 and a pair of annular chambers 90$c$ and 90$d$ are formed by three lands 92$a$, 92$b$ and 92$c$ of the spool 92.

With this second switching valve 90, when the line pressure is applied to the upper pressure chamber 90$a$ from the fluid circuit $P_{20}$, the spool 92 is moved down to communicate the fluid circuit $P_{11}$ with the fluid circuit $P_{22}$ across the annular chamber 90$c$ and to communicate the fluid circuit $P_{12}$ to the fluid circuit $P_{23}$ across the annular chamber 90d. When the line pressure is applied to the lower pressure chamber 90b from the fluid circuit $P_{21}$, the spool 92 is moved up to communicate the fluid circuit $P_{12}$ to the fluid circuit $P_{22}$ across the annular chamber 90c and to communicate the fluid circuit $P_{11}$ to the fluid circuit $P_{23}$ across the annular chamber 90d. Thus, the fluid actuator AC is operated in response to movements of the spool 92 to control the displacement ratio of the first pump-motor $M_1$.

Hereinafter, the operation of the hydromechanical transmission mentioned above will be described in detail. During stop of the engine E, the line pressure does not appear in the fluid circuit $P_2$ so that the spool 42 of the bypass valve 40 is positioned in its leftward stroke end to permit fluid communication between the fluid circuits $P_8$ and $P_9$. Thus, the fluid circuits $P_0$ and $P_1$ are bypassed by way of the fluid circuits $P_8$ and $P_9$. As a result, the hydromechanical transmission is conditioned in the neutral position wherein even if the input shaft 2 is driven, the output shaft 10 may not be rotated.

When the engine E is started with the shift lever 23 shifted to the neutral position N from the forward position F, the fluid pump P and the governor valve $G_1$ is rotated by the input shaft 2 to generate the line pressure and the governor pressure. The line pressure is applied to the fluid circuit $P_2$ and subsequently applied to the pressure chamber 40d of the bypass valve 40 by way of the first chamber 20a, the passage 22f and the second chamber 20b of the manual shift valve 20. On the other hand, the governor pressure is controlled in accordance with the rotation speed of the input shaft 2 and applied to the pressure chamber 40b of the bypass valve 40 by way of the fluid circuit $P_7$. In this instance, the piston 32 of the fluid actuator 30 is positioned in its rightward stroke end due to the line pressure in the left chamber 30a which is applied through the fluid circuits $P_2$ and $P_4$ while the shift lever 23 is previously positioned in the forward position F. Therefore, when the shift lever 23 is shifted to the neutral position N from the forward position F, the meshing engagement between the dog gear 4a of the gear 4 and the dog gear 5a of the gear 5 is maintained.

Under the above-mentioned condition, even if the rotation speed of the engine E increases, the spool 42 of the bypass valve 40 will remain in its leftward stroke end due to the line pressure in the chamber 40d to permit the fluid communication between the fluid circuits $P_8$ and $P_9$. As a result, the hydromechanical transmission is still conditioned in the neutral to allow the idling operation of the engine E. Furthermore, during this engine starting operation, the spool 122 of the clutch control valve 120 is held in the upward position by means of biasing of the spring 125 so that the fluid circuit $P_2$ is connected to the fluid circuit $P_{17}$ and the fluid circuit $P_{16}$ is connected to the reservoir Re. Thus, the line pressure is applied to the low speed range clutch LC through the fluid circuits $P_2$ and $P_{17}$ to cause the engagement of the low range clutch LC. The line pressure is also applied to the lower pressure chamber 120f of the clutch control valve 120 through the fluid circuit $P_{17}$ to move the piston 124 upward and further applied to the lower chamber 110d of the speed ratio responsive valve 110 to hold the spool 112 in the upward position. In this instance, the line pressure in the fluid circuit $P_{17}$ is further applied to the lower pressure chamber 90b of the second switching valve 90 by way of the second annular chamber 80b of the switching valve 80 and the fluid circuit $P_{21}$. This moves up the spool 92 of the valve 90 to connect the fluid circuit $P_{11}$ to the fluid circuit $P_{23}$ and to connect the fluid circuit $P_{12}$ to the fluid circuit $P_{22}$.

During the idling operation of the engine E, the spool 72 of the speed responsive valve 70 is positioned upward by loading of the spring 73 to connect the fluid circuit $P_2$ to the fluid circuit $P_{11}$ and to connect the fluid circuit $P_{12}$ to the reservoir Re. Thus, the line pressure is applied to the lower chamber $AC_1$ of the fluid actuator AC by way of the fluid circuits $P_2$, $P_{11}$ and $P_{23}$ so that the piston $AC_3$ of the actuator AC is urged to the upward stroke end thereof to make the first pump-motor $M_1$ in its full negative capacity as shown by a reference character $-V_M$ in FIG. 3. In this instance, as the throttle pressure in the lower chamber 130b of the pressure control valve 130 becomes larger than the governor pressure in the upper chamber 130a, the spool 132 moves upward to connect the fluid circuit $P_{11}$ to the fluid circuit $P_{24}$ in accordance with an instant difference between the throttle and governor pressures so that the controlled pressure is applied to the speed ratio detecting valve 100. This particular condition is called hereinafter as the first operation stage.

In the above-mentioned first operation stage, if the engine E is started with the shift lever 23 shifted from the reverse position R to the neutral position N, the piston 32 of the fluid actuator 30 is positioned in its leftward stroke end due to the line pressure in the right chamber 30b which is applied through the fluid circuits $P_2$ and $P_5$ while the shift lever 23 is previously positioned in the reverse position R. All other condition and operation are substantially as same as the first operation stage; this particular condition is called hereinafter as the second operation stage.

Under the above-mentioned first operation stage, when the shift lever 23 of the shift valve 20 is shifted from the neutral position N to the forward position F, the fluid circuit $P_2$ opening to the second port 21b is blocked by the land 22a of the spool 22 and the fluid circuit $P_3$ is connected to the reservoir Re thereby to eliminate the line pressure in the chamber 40d of the bypass valve 40. In this instance, the fluid circuit $P_2$ opening to the seventh port 21g is connected to the fluid circuit $P_4$ and the fluid circuit $P_5$ is communicated with the reservoir Re so that the piston 32 of the actuator 30 is held in the initial rightward stroke end to maintain the initial meshing engagement between the gear 4 and the gear 5 so as to complete the forward drive power train of the hydromechanical transmission H; this particular condition is called hereinafter as the third operation stage.

Moreover, under the above-mentioned second operation stage, when the shift lever 23 of the shift valve 20 is shifted from the neutral position N to the forward position F, the left chamber 30a of the actuator 30 is communicated with the fluid circuit $P_2$ through the fluid circuit $P_4$ and the right chamber 30b is connected to the reservoir Re through the fluid circuit $P_5$. This causes rightward movement of the piston 32 of the actuator 30 and the operation rod 52. During this rightward movement of the operation rod 52, the fluid circuit $P_2$ is temporarily connected to the fluid circuit $P_6$ across the annular chamber 50a of the control valve 50 so that the line pressure is applied to the pressure chamber 40a of the bypass valve 40 to move the spool 42 righward against loading of the spring 45. Thus, the fluid communication between the fluid circuits $P_8$ and $P_9$ is temporarily closed to operate the second pump-motor $M_2$ as a motor. Then, the gear 5 rotatable on the driving shaft 3 is driven by the motor operation of the second pump-motor $M_2$ by way of the low speed range clutch LC and the differential gear unit D so that the synchronized meshing engagement between the dog gear 4a of the gear 4 and the dog gear 5a of the gear 5 is conducted in response to the rightward movement of the selector lever CF to complete the forward drive power train of the hydromechanical transmission H.

After completion of the forward drive power train, when the opening angle $\theta$ of the throttle S is increased to a point $Q_1$ in FIG. 2a to accelerate the engine E, the throttle pressure applied to the fluid circuit $P_{10}$ is increased in accordance with the increase of the opening angle $\theta$ of the throttle S and the spool 72 of the speed responsive valve 70 is still held in the upward displaced position to maintain the communication between the fluid circuits $P_2$ and $P_{11}$. As the throttle pressure is larger than the governor pressure, the spool 132 of the pressure control valve 130 is also moved up to control the line pressure applied to the fluid circuit $P_{24}$ from the fluid circuit $P_{11}$. Thereafter, the governor pressure generated in the governor valve $G_1$ increases in response to acceleration of the engine E. When the governor pressure acting on the spool 72 is balanced with the total urging force of the spring 73 and the throttle pressure, the spool 72 is slightly moved down and the fluid circuits $P_{11}$ and $P_{12}$ are blocked by the lands 72b and 72c of the spool 72. Simultaneously, as the governor pressure acting on the spool 132 of the control valve 130 is balanced with the throttle pressure, the spool 132 is moved down due to fluid pressure in the annular chamber 130c to connect the fluid circuit $P_{24}$ to the reservoir Re and to connect the fluid circuit $P_{12}$ to the fluid circuit $P_{25}$. Subsequently, when the governor pressure is further increased, the spool 72 moves down to connect the fluid circuit $P_2$ to the fluid circuit $P_{12}$ and to connect the fluid circuit $P_{11}$ to the reservoir Re. Then, the piston $AC_3$ of the actuator AC is instantly moved down by the line pressure applied to the upper chamber $AC_2$ by way of the fluid circuits $P_2$, $P_{12}$ and $P_{22}$ so that the displacement of the first pump-motor $M_1$ is varied from the full negative capacity $-V_M$ to the full positive capacity $+V_M$ to increase the speed ratio e of the hydromechanical transmission H. In this instance, the spool 132 of the pressure control valve 130 is moved down in accordance with an instant difference between the governor and throttle pressures to regulate the line pressure applied to the fluid circuit $P_{25}$. Under this starting operation of the vehicle, running resistances are given to the engine E as a load which increases in response to the increase of the speed ratio e to restrain the increase of the engine rotation. Furthermore, in this increasing process of the speed ratio e, the spool 102 of the speed ratio detecting valve 100 is gradually moved down due to increasing of the governor pressure applied to the upper chamber 100a from the second governor valve $G_2$, but the fluid circuits $P_{24}$ and $P_{25}$ may not be connected to the fluid circuits $P_{15}$ and $P_{14}$ in this low speed travelling of the vehicle.

When the rotation speed of the engine E corresponds with a predetermined speed defined by a depression stroke of the accelerator pedal, the governor pressure acting on the spool 72 of the speed responsive valve 70 is balanced again with the total urging force of the spring 73 and the throttle pressure so that the spool 72 is slightly moved up and the fluid circuits $P_{11}$ and $P_{12}$ are blocked by the lands 72b and 72c of the spool 72. This results in blocking of the line pressure applied to the actuator AC to maintain the displacement capacity of the first pump-motor $M_1$ in a predetermined value. Thus, the increase of the speed ratio e is restrained in a low value to maintain the low speed travelling of the vehicle. Under this condition, as the governor pressure is balanced again with the throttle pressure, the spool 132 of the pressure control valve 130 is moved up due to fluid pressure previously applied into the annular chamber 130f from the fluid circuit $P_{25}$ through the orifice $O_3$ to connect the fluid circuit $P_{25}$ to the reservoir Re and to connect the fluid circuit $P_{11}$ to the fluid circuit $P_{24}$.

When the vehicle runs on a rising road during the low speed travelling, the rotation speed of the engine E is decreased due to increasing of the running resistances of the vehicle if the accelerator pedal is held in the same position. Then, the governor pressure of the valve $G_1$ is decreased and subsequently the spool 72 of the speed responsive valve 70 is further moved upward to connect the fluid circuit $P_2$ to the fluid circuit $P_{11}$ and to connect the fluid circuit $P_{12}$ to the reservoir Re. Thus, the piston $AC_3$ of the actuator AC is returned upward by the line pressure in the lower chamber $AC_1$ applied from the fluid circuits $P_2$, $P_{11}$ and $P_{23}$ so that the displacement capacity of the first pump-motor $M_1$ is varied toward the full negative capacity $-V_M$ to decrease the speed ratio e. Upon decreasing of the speed ratio e, the load acting on the engine E is decreased in accordance with decreasing of the travelling speed of the vehicle and then the rotation speed of the engine E will return to the predetermined speed mentioned above. In this instance, as the throttle pressure becomes larger than the governor pressure, the spool 132 of the pressure control valve 130 is moved up in accordance with a difference between the throttle and governor pressures to control the line pressure from the fluid circuit $P_{11}$.

When the vehicle runs downhill during the low speed travelling, the rotation speed of the engine E is increased due to decreasing of the running resistance of the vehicle so that the governor pressure of the valve $G_1$ is increased. Thus, the spool 72 of the speed responsive valve 70 is moved down to connect the fluid circuit $P_2$ to the fluid circuit $P_{12}$ and to connect the fluid circuit $P_{11}$ to the reservoir Re. Then, the piston $AC_3$ of the actuator AC is moved down by the line pressure in the upper chamber $AC_2$ applied through the fluid circuits $P_2$, $P_{12}$ and $P_{22}$. This varies the displacement capacity of the first pump-motor $M_1$ toward the full positive capacity $+V_M$ to increase the speed ratio e. Simultaneously, as the governor pressure becomes larger than the throttle pressure, the spool 132 of the pressure control valve 130 is moved down in accordance with an instant difference between the governor and throttle pressures to control the line pressure applied to the fluid circuit $P_{25}$ from the fluid circuit $P_{12}$.

When the speed ratio e increases to a certain range indicated by the characters $e_1^*$ and $e_2^*$ in FIG. 3, the spool 102 of the speed ratio detecting valve 100 is moved down due to increasing of the governor pressure from the governor valve $G_2$ so as to connect the fluid circuit $P_{24}$ to the fluid circuit $P_{15}$ and to connect the fluid circuit $P_{25}$ to the fluid circuit $P_{14}$. As a result, the controlled line pressure in the fluid circuit $P_{25}$ is applied to the upper chamber 120a of the clutch control valve 120 by way of the fluid circuits $P_{14}$ and $P_{18}$. In this instance, if the controlled line pressure in the upper chamber 120a is larger than a predetermined value, the spool 122 of the clutch control valve 120 is moved down to connect the fluid circuit $P_2$ to the fluid circuit $P_{16}$ and to connect the fluid circuit $P_{17}$ to the reservoir Re. This means the fact that only when an instant difference between the governor and throttle pressure becomes larger than a predetermined value, the clutch control valve 120 is operated to engage the high range clutch HC and to disengage the low range clutch LC. Thus, the transmission operation moves in its high speed ratio range from its low speed ratio range.

(If the controlled line pressure in the uppper chamber 120a is smaller than the predetermined value, the spool 122 of the clutch control valve 120 cannot be moved down. This means the fact that when the instant difference between the governor and throttle pressures is still smaller than the predetermined value, the clutch control valve 120 cannot be operated to maintain the engagement of the low range clutch LC.)

Under this condition, the spool 112 of the speed ratio responsive valve 110 is moved down to its downward stroke end due to the line pressure applied to the upper chamber 110a from the fluid circuit $P_{16}$ and the spool 92 of the second switching valve 90 is also moved down to its downward stroke end due to the line pressure applied to the upper chamber 90a by way of the fluid circuits $P_{16}$ and $P_{20}$. Subsequently, the further increase of the speed ratio e applies the line pressure from the fluid circuit $P_{12}$ to the lower chamber $AC_1$ of the actuator AC to move the piston $AC_3$ upward. This varies the displacement capacity of the first pump-motor $M_1$ from the full positive capacity $+V_M$ to the full negative capacity $-V_M$ within the area indicated with a reference character b in FIG. 3. Thus, the load acting on the engine E will increase in accordance with the increase of the speed of the vehicle to maintain the rotation speed of the engine E in the predetermined value.

Described hereinafter in detail is the case when the accelerator pedal is further depressed to increase the opening angle $\theta$ of the throttle S to a point $Q_2$ indicated in FIG. 2a while the vehicle is travelling at a low speed on a plane road. In this instance, the throttle pressure is instantly applied to the fluid circuit $P_{10}$ in proportion to the depression amount of the accelerator pedal so that the spool 72 of the speed responsive valve 70 is moved upward by the increased throttle pressure applied to the lower chamber 70e from the fluid circuit $P_{10}$. This connects the fluid circuit $P_2$ to the fluid circuit $P_{11}$ and the fluid circuit $P_{12}$ to the reservoir Re. Thus, the piston $AC_3$ of the actuator AC is temporarily moved upward to vary the displacement capacity of the first pump-motor $M_1$ toward the full negative capacity $-V_M$. This results in decreasing of the speed ratio e and the load acting on the engine E. Simultaneously, as the throttle pressure becomes larger than the governor pressure, the spool 132 of the pressure control valve 130 is moved up to connect the fluid circuit $P_{11}$ to the fluid circuit $P_{24}$ and to connect the fluid circuit $P_{25}$ to the reservoir Re. Thereafter, the rotation speed of the engine E is rapidly increased in response to increasing of the opening angle of the throttle S and subsequently the governor pressure in the valve $G_1$ is increased. In other word, even if the speed ratio decreases, the travelling speed of the vehicle may not be decreased due to the increase of the rotation speed of the engine E.

When the governor pressure of the valve $G_1$ corresponds with a predetermined throttle pressure defined by the throttle valve 60 in accordance with the depression amount of the accelerator pedal, the governor pressure acting on the spool 72 is balanced with the total urging force of the spring 73 and the instant throttle pressure so that the spool 72 is slightly moved down to block the communication of the fluid circuit $P_2$ against the fluid circuits $P_{11}$ and $P_{12}$. In this instance, due to balance of the governor pressure with the throttle pressure, the spool 132 of the pressure control valve 130 is moved down by fluid pressure previously applied in the annular chamber 130c to connect the fluid circuit $P_{24}$ to the reservoir Re and to connect the fluid circuit $P_{12}$ to the fluid circuit $P_{25}$. When the rotation speed of the engine E is further increased, the governor pressure of the valve $G_1$ is further increased to move the spool 72 downward. This provides the communication between the fluid circuits $P_2$ and $P_{12}$ and between the fluid circuit $P_{11}$ and the reservoir Re to apply the line pressure to the upper chamber $AC_2$ of the actuator AC by way of the fluid circuits $P_2$, $P_{12}$ and $P_{22}$. Then, the piston $AC_3$ of the actuator AC is moved down to vary the displacement capacity of the first pump-motor $M_1$ toward the full positive capacity $+V_M$. This results in increasing of the speed ratio e and the travelling speed. Under this condition, the spool 132 of the pressure control valve 130 is moved in accordance with an instant difference between the governor and throttle pressures to control the line pressure applied to the fluid circuit $P_{25}$ from the fluid circuit $P_{12}$. Moreover, the load acting on the engine E is increased due to the increase of the travelling speed, but due to the high power of the engine E the rotation speed of the engine E does not decrease and the speed ratio e is kept to increase.

Subsequently, when the speed ratio e is increased up to the figure $e_1^*$, the spool 102 of the speed ratio detecting valve 100 is moved down to connect the fluid circuit $P_{24}$ to the fluid circuit $P_{15}$ and to connect the fluid circuit $P_{25}$ to the fluid circuit $P_{14}$. Then, the controlled line pressure is applied to the upper chamber 120a of the clutch control valve 120 by way of the fluid circuit $P_{25}$, $P_{14}$ and $P_{18}$. If the controlled line pressure in the upper chamber 120a becomes larger than the predetermined value previously described above, the clutch control valve 120 is operated to engage the high range clutch HC and to disengage the low range clutch LC. In this instance, the spool 112 of the speed ratio responsive valve 100 is moved to its downward stroke end and the spool 92 of the second switching valve 90 is also moved downward. Thus, the piston $AC_3$ of the actuator AC is moved upward by the line pressure applied into the lower chamber $AC_1$ by way of the fluid circuit $P_{12}$ and the displacement capacity of the first pump-motor $M_1$ is varied toward the full negative capacity $-V_M$ within the area b indicated in FIG. 3 to further increase the speed ratio e.

When the speed ratio e and the travelling speed are further increased, the running resistances of the vehicle increase to cause the increase of the load acting on the engine E and subsequently the rotation speed of the engine E is maintained in a predetermined high speed. Under this condition, the governor pressure acting on the spool 72 of the valve 70 is balanced with the total urging force of the spring 73 and the throttle pressure so that the spool 72 is slightly moved up to block the communication of the fluid circuit $P_2$ against the fluid circuits $P_{11}$ and $P_{12}$. This results in blocking of the line pressure applied to the actuator AC to maintain the displacement capacity of the first pump-motor $M_1$ in a predetermined value. Thus, the speed ratio e is restrained in a high value to maintain the high speed travelling of the vehicle.

During the high speed travelling of the vehicle, if the accelerator pedal is released to close the throttle S, the throttle pressure is temporarily increased as shown in FIG. 2a and the spool 72 of the valve 70 is moved up to connect the fluid circuit $P_2$ to the fluid circuit $P_{11}$. This causes downward movement of the piston $AC_3$ of the actuator AC due to the line pressure applied to the upper chamber $AC_2$ through the fluid circuits $P_2$, $P_{11}$ and $P_{22}$. Then, the displacement capacity of the first pump-motor $M_1$ is varied toward the full positive capacity $+V_M$ to decrease the speed ratio e. Under this condition, as the throttle pressure becomes larger than the governor pressure, the spool 132 of the pressure control valve 130 is moved up in accordance with an instant difference between the throttle and governor pressures to control the line pressure applied to the fluid circuit $P_{24}$ from the fluid circuit $P_{11}$. In this decreasing process of the speed ratio e, when the speed ratio e is decreased down to the range indicated by the characters $e_1^*$ and $e_2^*$ in FIG. 3, the spool 102 of the speed ratio detecting valve 100 moves up to connect the fluid circuit $P_{24}$ to the fluid circuit $P_{15}$ and to connect the fluid circuit $P_{25}$ to the fluid circuit $P_{14}$. Then, the controlled line pressure is applied to the lower chamber 120b of the clutch control valve 120 from the fluid circuit $P_{24}$ through the fluid circuits $P_{15}$ and $P_{19}$. If the controlled pressure in the lower chamber 120b is larger than the predetermined value, the clutch control valve 120 is operated to disengage the high range clutch HC and to engage the low range clutch LC. Furthermore, in this instance, due to the line pressure from the fluid circuit $P_{17}$ the spool 112 of the speed ratio responsive valve 110 is moved upward and the spool 92 of the second switching valve 90 is also moved upward. Thereafter, when the speed ratio e is further decreased, the piston $AC_3$ of the actuator AC is moved upward by the line pressure applied to the lower chamber $AC_1$ from the fluid circuit $P_{11}$ to vary the displacement capacity of the first pump-motor $M_1$ toward the full negative capacity $-V_M$ from the approximate full positive capacity $+V_M$ within the area a indicated in FIG. 3. Under this condition, the output power of the engine E is decreased upon releasing of the accelerator pedal and the rotation speed of the engine E is increased in response to the decrease of the speed ratio e. This causes the engine braking operation of the vehicle.

During the high speed travelling of the vehicle, when the vehicle runs on a rising road, the running resistances of the vehicle increase to cause the increase of the load acting on the engine E. Therefore, if the accelerator pedal is kept in the same depressed position, the rotation speed of the engine E is decreased to decrease the governor pressure of the valve $G_1$. Then, the spool 72 of the speed responsive valve 70 is moved upward to connect the fluid circuit $P_2$ to the fluid circuit $P_{11}$ and to connect the fluid circuit $P_{12}$ to the reservoir Re. This causes downward movement of the piston $AC_3$ of the actuator AC due to the line pressure applied to the upper chamber $AC_2$ from the fluid circuit $P_{11}$. Thus, the displacement capacity of the first pump-motor $M_1$ is varied toward the full positive capacity $+V_M$ to decrease the speed ratio e and the travelling speed of the vehicle, and subsequently the increase of the load acting on the engine E is restrained to maintain the rotation speed of the engine E. Under this condition, as the governor pressure becomes smaller than the throttle pressure, the spool 132 of the pressure control valve 130 is moved up in accordance with an instant difference between the governor and throttle pressures to control the line pressure applied to the fluid circuit $P_{24}$ from the fluid circuit $P_{11}$. In this decreasing process of the speed ratio e, if the speed ratio e is decreased near to the figure $e_2^*$ before the rotation speed of the engine E reaches the predetermined speed, the line pressure is continuously applied to the actuator AC so that the speed ratio e is further decreased in accordance with the continuous variation of the displacement capacity of the first pump-motor $M_1$. When the speed ratio e is decreased down to the range indicated by the characters $e_1^*$ and $e_2^*$, the spool 102 of the speed ratio detecting valve 100 is moved upward to connect the fluid circuit $P_{24}$ to the fluid circuit $P_{15}$ and to connect the fluid circuit $P_{25}$ to the fluid circuit $P_{14}$. Then, the controlled line pressure in the fluid circuit $P_{24}$ is applied to the lower chamber 120b of the clutch control valve 120. If the controlled line pressure in the lower chamber 120b is larger than the predetermined value, the spool 122 of the clutch control valve 120 is moved upward to connect the fluid circuit $P_2$ to the fluid circuit $P_{17}$ and to connect the fluid circuit $P_{16}$ to the reservoir Re. Then, the high speed range clutch HC is disengaged and the low speed range clutch LC is engaged to convert the transmission operation from the high speed ratio range to the low speed ratio range. In this instance, due to the line pressure applied from the fluid circuit $P_{17}$ the spool 112 of the valve 110 is moved to the upward stroke end thereof and the spool 92 of the second switching valve 90 is also moved to the upward stroke end thereof. Thereafter, when the speed ratio e is further decreased, the piston $AC_3$ of the actuator AC is moved upward due to the line pressure applied to the lower chamber $AC_1$ from the fluid circuit $P_{11}$ so that the displacement capacity of the first pump-motor $M_1$ is gradually varied from the approximate full positive capacity $+V_M$ to the full negative capacity $-V_M$ within the area a in FIG. 3 to decrease the speed ratio e.

In the above-mentioned first operation stage, when the engine E is operated with the shift lever 23 shifted from the neutral position N to the reverse position R, the fluid circuit $P_2$ is connected to the fluid circuit $P_5$ across the annular chamber 20d of the valve 20 so that the line pressure is applied to the lower chamber 80c of the switching valve 80 to displace the spool 82 upward. Then, the fluid circuit $P_{17}$ is connected to the fluid circuit $P_{20}$ to apply the line pressure to the upper chamber 90a of the second switching valve 90. This moves the spool 92 downward to communicate the fluid circuit $P_{11}$ to the fluid circuit $P_{22}$. Thus, the piston $AC_3$ of the actuator AC is moved to the downward stroke end thereof due to the line pressure applied to the upper chamber $AC_2$ from the fluid circuit $P_{11}$ and subsequently the initial displacement capacity of the first pump-motor $M_1$ is converted from the full negative capacity $-V_M$ to the full positive capacity $+V_M$. In this instance, as the fluid circuit $P_4$ is communicated with the reservoir Re across the annular chamber 20c of the shift valve 20, the piston 32 of the actuator 30 is moved leftward due to the line pressure applied to the right chamber 30b from the fluid circuit $P_5$ so that the selector lever CF disengages the dog gear 4a of the gear 4 from the dog gear 5a of the gear 5. Moreover, during the leftward movement of the piston 32, the fluid circuit $P_2$ is temporarily communicated with the fluid circuit $P_6$ across the annular chamber 50a of the control valve 50 to apply the line pressure to the chamber 40a of the bypass valve 40. This moves the spool 42 of the bypass valve 40 rightward to temporarily block the fluid communication between the fluid circuits $P_8$ and $P_9$. Thus, the second pump-motor $M_2$ is operated as a motor to conduct the synchronized meshing engagement of the gear 4 with the gear 6a on the counter shaft 6; this condition is called as the fourth operation stage. Under this fourth operation stage, the reverse driven power train of the transmission is completed by the synchronized engagement of the gear 4 and the gear 6a to drive the output shaft 10 in the reverse direction.

From the above detailed description, it will be recognized that the line pressure is controlled by the pressure control valve 130 in accordance with an instant difference between the governor and throttle pressures and that only when the controlled line pressure is larger than the predetermined value, tha clutch control valve 120 is operated to switchover the low speed drive power train to and from the high speed drive power train.

Figure 4:
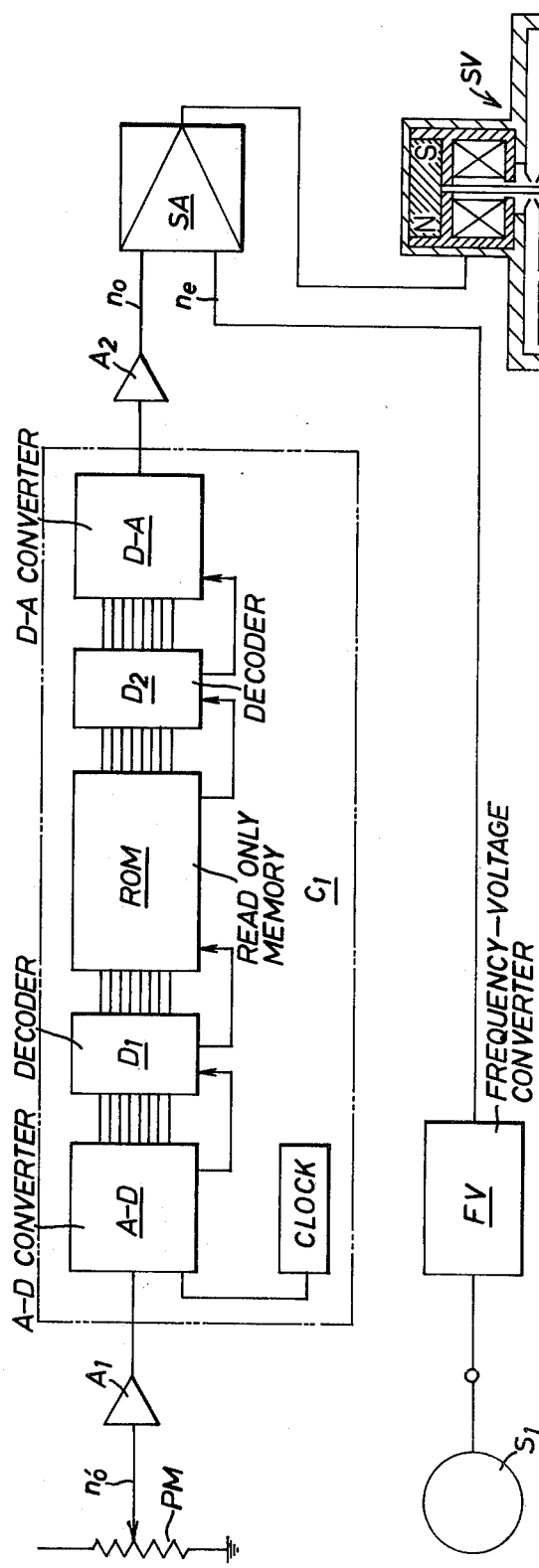
FIG. 4 illustrates a block diagram of an electric control system for operating a servo-valve, which corresponds with the response valve shown in FIG. 2A, FIG. 4 including FIGS. 4A and 4B which illustrate throttle signals varing in accordance with opening angle of a throttle.
Figure 4A:
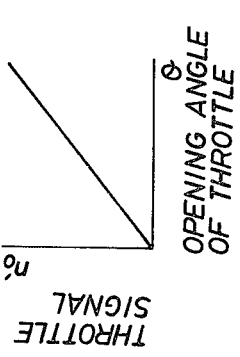
Figure 4B:
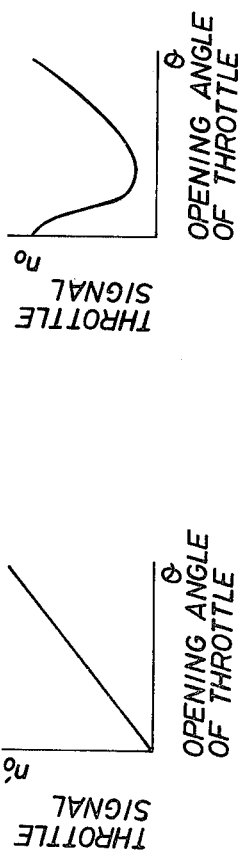

FIG. 4 illustrates an electric control system which corresponds equivalently with the throttle valve 60, the speed responsive valve 70 and the pressure control valve 130 shown in FIG. 2A. In the electric control system, a servo-valve SV is provided to control the line pressure and a servo-amplifier SA is provided to control the operation of the servo-valve SV. The servo-amplifier SA is operated in accordance with first and second voltage signals $n_o$ and $n_e$ which correspond respectively with the throttle pressure and the governor pressure in the above-embodiment. The first voltage signal $n_o$ is applied to the first input terminal of the servo-amplifier SA from a potentiometer $P_M$ by way of a first amplifier $A_1$, a function converter $C_1$ and a second amplifier $A_2$. The potentiometer $P_M$ is operated in accordance with variation of the opening angle of the throttle S to generate a voltage $n_o'$ which is detected as the first voltage signal $n_o$ by conversion in the function converter $C_1$. The function converter $C_1$ comprises an analogue-digital converter A–D, a first decoder $D_1$, a read only memory ROM, a second decoder $D_2$ and a digital-analogue converter D–A. The second voltage signal $n_e$ is applied to the second input terminal of the servo-amplifier SA from a sensor $S_1$ by way of a frequency-voltage converter FV. The sensor $S_1$ is mounted on a portion of the input shaft 2 to detect the rotation speed of the input shaft 2.

In the servo-amplifier SA, the first and second voltage signals $n_o$ and $n_e$ are constantly compared and amplified. When the first voltage signal $n_o$ is larger than the second voltage signal $n_e$, the servo-amplifier SA generates a negative voltage which is applied to the servo-valve SV. In this instance, the servo-valve SV acts to connect the fluid circuit $P_2$ to the fluid circuit $P_{11}$ and to connect the fluid circuit $P_{12}$ to the reservoir Re. When the first voltage signal $n_o$ is smaller than the second voltage signal $n_e$, the servo-amplifier SA generates a positive volgage and subsequently the servo-valve SV acts to connect the fluid circuit $P_2$ to the fluid circuit $P_{12}$ and to connect the fluid circuit $P_{11}$ to the reservoir Re. When the positive and negative voltages are not applied to the servo-valve SV, the fluid circuit $P_2$ is isolated from the fluid circuits $P_{11}$ and $P_{12}$ in the servo-valve SV. Furthermore, in the servo-amplifier SA it should be recognized that the positive and negative voltages are respectively varied in accordance with an instant difference between the first and second voltage signals $n_o$ and $n_e$.

Figure 5:
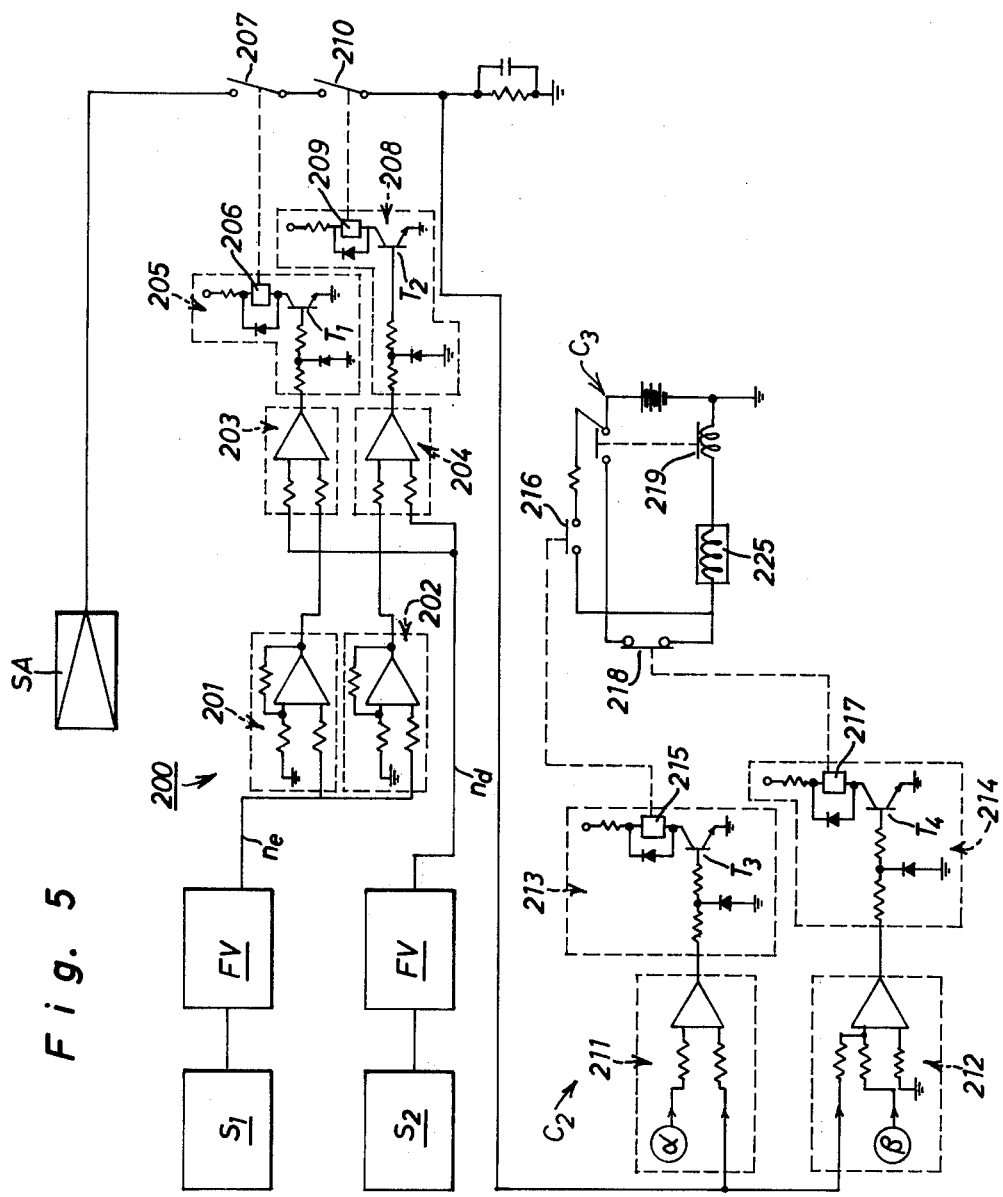
FIG. 5 illustrates an electric control system for operating an electrically operated clutch control valve, which corresponds with the clutch control valve shown in FIG. 2C.
Figure 6:
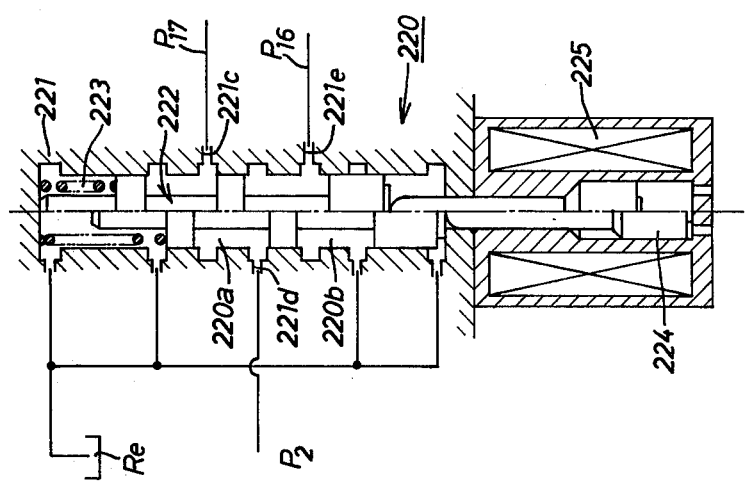
FIG. 6 is a sectional view of the clutch control valve operated by the electric control system of FIG. 5.

FIGS. 5 and 6 illustrate an electric control system 200 and a solenoid valve 220 which correspond with the speed ratio detecting valve 100 and the clutch control valve 120 in the above-embodiment.

As shown in FIG. 6, the solenoid valve 220 comprises a housing 221 with seven ports and a spool 222 with three lands. The spool 222 is normally biased downward by a return spring 223 and engaged with a plunger 224 at the bottom end thereof. In the solenoid valve 220, during deenergization of a solenoid 225, the spool 222 is positioned in the downward stroke end to connect the fluid circuit $P_2$ to the fluid circuit $P_{17}$ across an annular chamber 220a and to connect the fluid circuit $P_{16}$ to the reservoir Re across an annular chamber 220b. When the spool 222 is moved up by the plunger 224 against the spring 223 in response to energization of the solenoid 225, the fluid circuit $P_2$ is connected to the fluid circuit $P_{16}$ across the chamber 220b and the fluid circuit $P_{17}$ is connected to the reservoir Re across the chamber 220a.

In FIG. 5, the electric control system 200 is provided to control the solenoid valve 220 and comprises a first multiplier 201 to multiply the second voltage signal $n_e$ by the speed ratio $e_2^*$ and a second multiplier 202 to multiply the second voltage signal $n_e$ by the speed ratio $e_1^*$, the second voltage signal $n_e$ being detected in the electric control system of FIG. 4 and the speed ratios being indicated in FIG. 3. The electric control system 200 further comprises a first comparator 203 in which an output signal from the first multiplier 201 is compared with a third voltage signal $n_d$ and a second comparator 204 in which an output signal from the second multiplier 202 is compared with the third voltage signal $n_d$. The third voltage signal $n_d$ is applied to the comparators 203 and 204 from a second sensor $S_2$ through a frequency-voltage converter FV. The sensor $S_2$ is mounted on a portion of the output shaft 10. Thus, the third voltage signal $n_d$ corresponds with the governor pressure from the governor valve $G_2$ of the above-embodiment.

With the above-mentioned comparators 203 and 204, when the output signal from the first multiplier 201 is larger than the third voltage signal $n_d$, an output voltage is applied to a transistor $T_1$ of a first switching circuit 205. In this instance, a relay 206 is energized by conduction of the transistor $T_1$ to close a normally open contact 207. When the output signal from the second multiplier 202 is smaller than the third voltage signal $n_d$, an output voltage is applied to a transistor $T_2$ of a second switching circuit 208. In this instance, a relay 209 is energized by conduction of the transistor $T_2$ to close a normally open contact 210. Furthermore, in this electric control system 200, the servo-amplifier SA of FIG. 4 is connected through the contacts 207 and 210 to a circuit $C_2$. The circuit $C_2$ includes third and fourth comparators 211 and 212 which are respectively connected to third and fourth switching circuits 213 and 214 for a driving circuit $C_3$. The third comparator 211 functions to compare a positive voltage from the servo-amplifier SA with an electric signal $\alpha$ of a predetermined voltage, which corresponds with the controlled line pressure of the predetermined value in the upper pressure chamber 120a of the clutch control valve 120. The fourth comparator 212 functions to compare a negative voltage from the servo-amplifier SA with an electric signal $\beta$ of a predetermined voltage, which corresponds with the controlled line pressure of the predetermined value in the lower pressure chamber 120b of the clutch control valve 120. The driving circuit $C_3$ includes the solenoid 225 of the solenoid valve 220 shown in FIG. 6.

When a positive voltage from the servo-amplifier SA is larger than the electric signal $\alpha$, the comparator 211 generates an output signal under closing condition of the contacts 207 and 210. Then, only a transistor $T_3$ of the third switching circuit 213 is turned on by the output signal from the comparator 211 so that a relay 215 is driven to close a normally open contact 216. As a result, the solenoid 225 of the valve 220 is energized to move the spool 222 upward and a self-holding relay 219 is energized to maintain the energization of the solenoid 225. When a negative voltage from the servo-amplifier SA is larger than the electric signal $\beta$, the comparator 212 generates an output signal under closing condition of the contacts 207 and 210. Then, only a transistor $T_4$ of the fourth switching circuit 214 is turned on by the output signal from the comparator 212 so that a relay 217 is driven to open a normally close contact 218. As a result, the solenoid 225 of the valve 220 is deenergized to move down the spool 122.

In other words, within the electric control system 200, while the speed ratio e is maintained in the range between the lower limit $e_1^*$ and the higher limit $e_2^*$, the contacts 207 and 210 are closed. Under this condition, when the positive voltage from the servo-amplifier SA is larger than the electric signal $\alpha$, the comparator 211 turns on the transistor $T_3$ so that the contact 216 of the driving circuit $C_3$ is closed to energize the solenoid 225 of the valve 220. When the negative voltage from the servo-amplifier SA is larger than the electric signal $\beta$, the comparator 212 turns on the transistor $T_4$ so that the contact 218 of the driving circuit $C_3$ is opened to deenergize the solenoid 225 of the valve 220. Thus, the electric control system 200 and the solenoid valve 220 have the same functions as the speed ratio detecting valve 100 and the clutch control valve 120.

Figure 7:
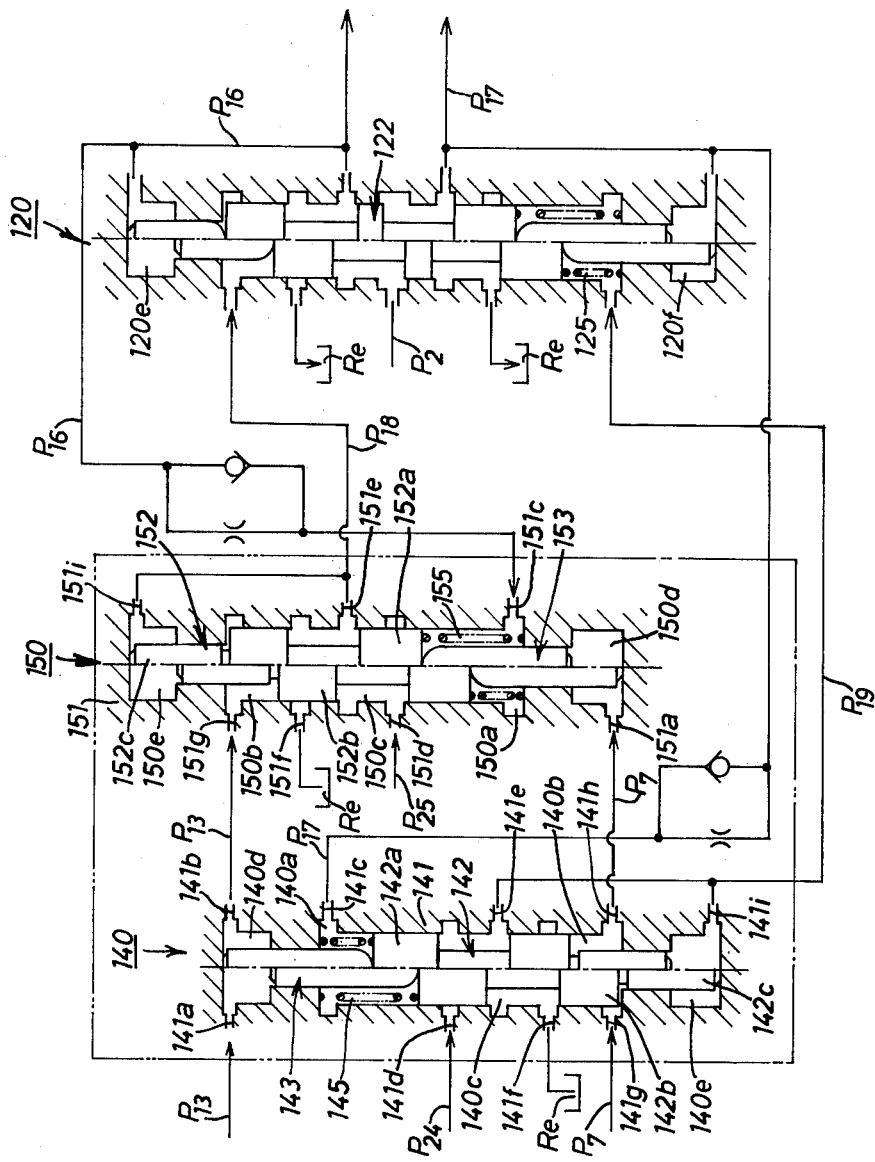
FIG. 7 illustrates a modification of the speed ratio detecting valve shown in FIG. 2C.

In FIG. 7, there is a modification of the speed ratio detecting valve 100, in which a first speed ratio detecting valve 140 is provided to connect the fluid circuit $P_{24}$ to the fluid circuit $P_{19}$ only when the actual speed ratio e drops below the figure $e_2^*$ under the engagement of the high range clutch HC and a second speed ratio detecting valve 150 is provided to connect the fluid circuit $P_{25}$ to the fluid circuit $P_{18}$ only when the actual speed ratio e rises up over the figure $e_1^*$ under the engagement of the low range clutch LC.

The first speed ratio detecting valve 140 comprises a spool 142 and a piston 143 reciprocable within a housing 141. The housing 141 is provided thereon with nine ports 141a to 141i inclusive. The first and second ports 141a and 141b are disposed within the fluid circuit $P_{13}$, the third port 141c is connected to the fluid circuit $P_{17}$, the fourth port 141d is connected to the fluid circuit $P_{24}$, the fifth and ninth ports 141e and 141i are connected to the fluid circuit $P_{19}$ and the seventh and eighth ports 141g and 141h are disposed within the fluid circuit $P_7$. The spool 142 has three lands 142a to 142c and is engaged at its upper end with the piston 143. The spool 142 is normally biased downward by a compression spring 145. Within the housing 141, a pair of chambers 140a and 140b is formed by the first and second lands 142a and 142b, an annular chamber 140c is formed between the lands 142a and 142b, a chamber 140d is formed by the piston 143 and a chamber 140e is formed by the third land 142c of the spool 142.

The second speed ratio detecting valve 150 comprises a spool 152 and a piston 153 reciprocable within a housing 151. In this valve 150, a port 151a is connected to the fluid circuit $P_7$, a port 151c is connected to the fluid circuit $P_{16}$, a port 151d is connected to the fluid circuit $P_{25}$, ports 151e and 151i are connected to the fluid circuit $P_{18}$ and a port 151g is connected to the fluid circuit $P_{13}$. The spool 152 has three lands 152a to 152c and is engaged at its lower end with the piston 153. The spool 152 is normally biased upward by a compression spring 155. Within the housing 151, a pair of chambers 150a and 150b is formed by the first and second lands 152a and 152b, an annular chamber 150c is formed between the lands 152a and 152b, a chamber 150d is formed by the piston 153 and a chamber 150e is formed by the third land 152c of the spool 152.

In operation of the first and second speed ratio detecting valves 140 and 150, when the hydromechanical transmission is inoperative, the spool 142 of the first valve 140 is positioned in the downward stroke end due to biasing of the spring 145, the spool 152 of the second valve 150 is positioned in the upward stroke end due to biasing of the spring 155, and the spool 122 of the clutch control valve 120 is positioned in the upward stroke end due to biasing of the spring 125. Under this condition, the line pressure generated by the fluid pump P is instantly applied to the fluid circuit $P_{17}$ through the fluid circuit $P_2$ to engage the low range clutch LC. The line pressure is also applied through the fluid circuit $P_{17}$ to the lower chamber 120f of the valve 120 and the chamber 140a of the first valve 140 so that the spool 122 of the clutch control valve 120 is held in the upward position due to the line pressure in the chamber 120f and the spool 142 of the first valve 140 is also held in the downward position due to the line pressure in the chamber 140a. In this instance, the fluid circuit $P_{24}$ is blocked by the spool 142 and the fluid circuit $P_{19}$ is connected to the reservoir Re through the first valve 140. On the other hand, the fluid circuit $P_{25}$ is blocked by the spool 152 of the second valve 150 and the fluid circuit $P_{16}$ is connected to the reservoir Re through the clutch control valve 120.

When the actual speed ratio e rises up over the figure $e_1^*$ under the engagement of the low range clutch LC, the spool 152 of the second valve 150 is moved down by the increase of the governor pressure applied into the chamber 150b from the fluid circuit $P_{13}$ to connect the fluid circuit $P_{25}$ to the fluid circuit $P_{18}$. This moves down the spool 122 of the clutch control valve 120 to apply the line pressure to the fluid circulit $P_{16}$ from the fluid circuit $P_2$ and to connect the fluid circuit $P_{17}$ to the reservoir Re. Thus, the low range clutch LC is disengaged and the high range clutch HC is engaged to complete the high speed drive power train. In this instance, the line pressure in the chamber 120f of the valve 120 and the chamber 140a of the first valve 140 is discharged, whereas the line pressure from the fluid circuit $P_{16}$ is applied to the chamber 150a of the second valve 150 to move up the spool 152 so as to connect the fluid circuit $P_{18}$ to the reservoir Re. The line pressure is also applied to the upper chamber 120e of the valve 120 to hold the spool 122 in the downward position.

When the actual speed ratio e drops below the figure $e_2^*$ under the engagement of the high range clutch HC, the spool 142 of the first valve 140 is moved up by the increase of the governor pressure applied into the chamber 140b from the fluid circuit $P_7$ to connect the fluid circuit $P_{24}$ to the fluid circuit $P_{19}$. This moves up the spool 122 of the clutch control valve 120 to apply the line pressure to the fluid circuit $P_{17}$ and to connect the fluid circuit $P_{16}$ to the reservoir Re. Thus, the high range clutch HC is disengaged and the low range clutch LC is engaged to complete the low speed drive power train. In this instance, the line pressure in the chamber 120e of the valve 120 and the chamber 150a of the valve 150 is discharged, whereas the line pressure from the fluid circuit $P_{17}$ is applied to the chamber 140a of the first valve 140 to move down the spool 142 so as to connect the fluid circuit $P_{19}$ to the reservoir Re. The line pressure is also applied to the lower chamber 120f of the valve 120 to hold the spool 122 in the upward position.

Figure 8:
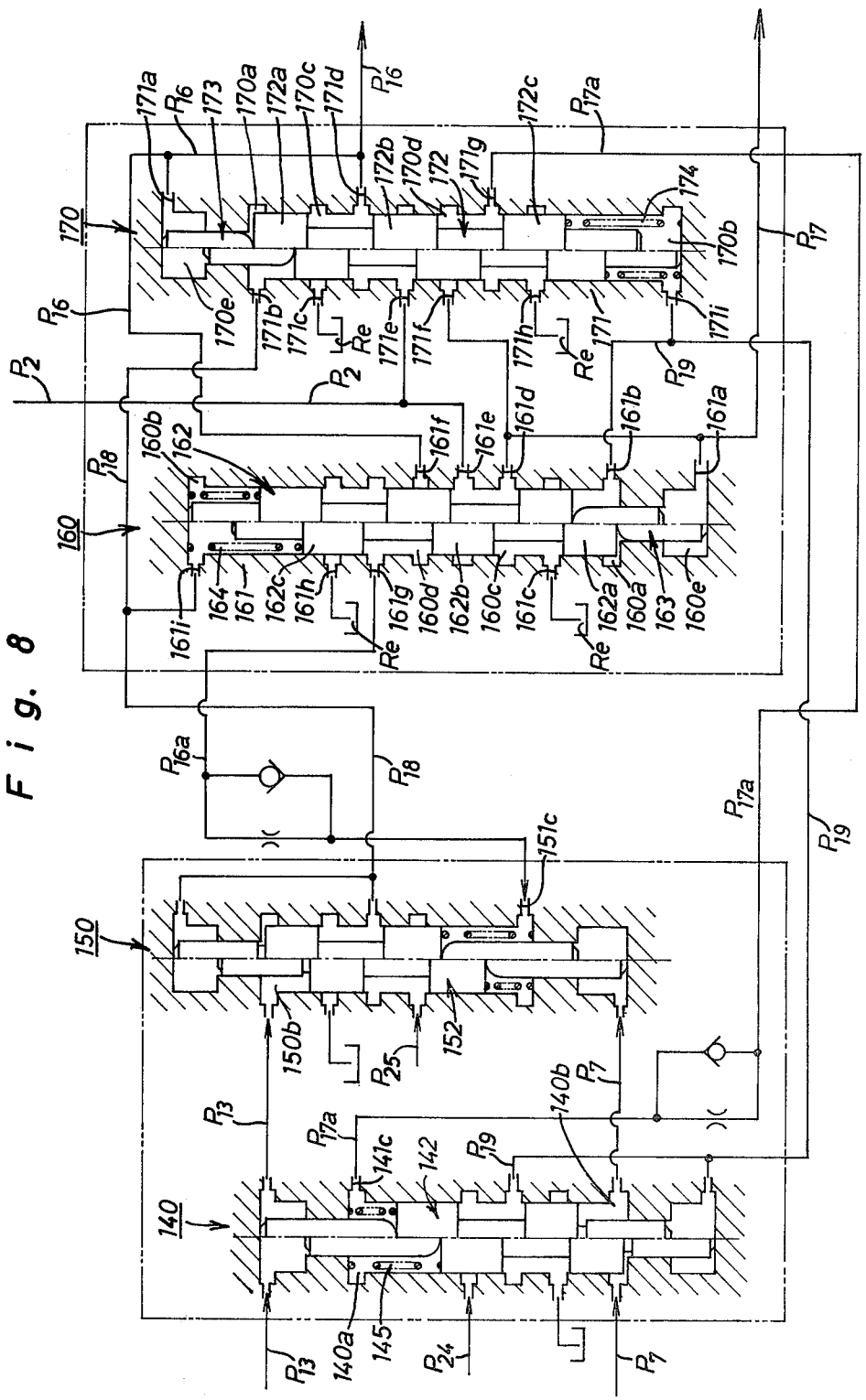
FIG. 8 illustrates a modification of the clutch control valve shown in FIG. 2C.

In FIG. 8, there is a modification of the clutch control valve 120, which comprises low and high range clutch control valves 160 and 170. The low range clutch control valve 160 is provided to selectively connect the fluid circuit $P_2$ to the fluid circuit $P_{17}$ and to selectively connect the fluid circuit $P_{16}$ to a fluid circuit $P_{16a}$. The low range clutch control valve 160 comprises a spool 162 and a piston 163 reciprocable within a housing 161. The housing 161 is provided thereon with nine ports 161a to 161i, inclusive. The first and fourth ports 161a and 161d are connected to the fluid circuit $P_{17}$, the second port 161b is connected to the fluid circuit $P_{19}$, the fifth port 161e is connected to the fluid circuit $P_2$, the sixth port 161f is connected to the fluid circuit $P_{16}$, the seventh port 161g is connected through the fluid circuit $P_{16a}$ to the third port 151c of the detecting valve 150 and the ninth port 161i is connected to the fluid circuit $P_{18}$. The spool 162 has three lands 162a to 162c and is engaged at its downward stroke end with the piston 163. The spool 162 is normally biased downward by a compression spring 164. Within the housing 161, a pair of chambers 160a and 160b is formed at the opposite ends of the spool 162, a pair of annular chambers 160c and 160d is formed by the respective lands 162a to 162c, and a chamber 160e is formed by the piston 163.

The high range clutch control valve 170 is provided to selectively connect the fluid circuit $P_2$ to the fluid circuit $P_{16}$ and to selectively connect the fluid circuit $P_{17}$ to the fluid circuit $P_{17a}$. The valve 170 has substantially the same construction as that of the low range clutch control valve 160. Therefore, similar reference numerals and characters are used for the same component parts and portions and no explanation is made in connection therewith.

In operation of the low and high range clutch control valves 160 and 170, when the hydromechanical transmission is inoperative, the spool 162 of the control valve 160 is in the downward position by the spring 164 to block the fluid communication between the fluid circuit $P_2$ and the fluid circuit $P_{17}$, while the spool 172 of the control valve 170 is in the upward position by the spring 174 to block the fluid communication between the fluid circuits $P_2$ and $P_{16}$. In this instance, the spool 142 of the first speed ratio detecting valve 140 is in the downward position by the spring 145 to connect the fluid circuit $P_{19}$ to the reservoir Re, while the spool 152 of the second speed ratio detecting valve 150 is in the upward position to connect the fluid circuit $P_{18}$ to the reservoir Re. In such an initial condition, when the governor pressure is applied to the fluid circuit $P_7$ from the first governor valve $G_1$, the spool 142 of the first valve 140 is moved up against the spring 145 due to the governor pressure applied into the chamber 140b to connect the fluid circuit $P_{24}$ to the fluid circuit $P_{19}$. Then, the controlled line pressure is applied into the chamber 160a of the control valve 160 from the fluid circuit $P_{19}$ so that the spool 162 moves up against the spring 164 to connect the fluid circuit $P_2$ to the fluid circuit $P_{17}$ and to connect the fluid circuit $P_{16a}$ to the reservoir Re. This engages the low range clutch LC. In this instance, the piston 163 of the control valve 160 is moved up due to the line pressure applied into the chamber 160e from the fluid circuit $P_{17}$ to hold the spool 162 in the upward position. The line pressure is also applied to the chamber 140a by way of an annular chamber 170d of the valve 170 and the fluid circuit $P_{17a}$ to move down the spool 142 against the governor pressure in the chamber 140b. This connects the fluid circuit $P_{19}$ to the reservoir Re.

Subsequently, when the actual speed ratio e reaches in the range defined by the figures $e_1^*$ and $e_2^*$ under the engagement of the low range clutch LC, the spool 152 of the second valve 150 is moved down due to the increase of the governor pressure in the chamber 150b to connect the fluid circuit $P_{25}$ to the fluid circuit $P_{18}$. Then, the controlled line pressure from the fluid circuit $P_{25}$ is applied into the chamber 170a of the control valve 170 and the chamber 160b of the control valve 160 through the fluid circuit $P_{18}$. When the controlled line pressure rises up to a first predetermined value smaller than the predetermined value in the clutch control valve 120 of FIG. 2C, the spool 172 of the valve 170 is moved down against biasing of the spring 174 to apply the line pressure to the fluid circuit $P_{16}$ from the fluid circuit $P_2$. This engages the high range clutch HC under the engagement of the low range clutch LC. In this instance, the line pressure is also applied into the chamber 170e of the valve 170 to hold the spool 172 in the downward position, while the line pressure in the chamber 140a of the first valve 140 is discharged by way of the fluid circuit $P_{17a}$. Thereafter, when the controlled line pressure in the chamber 160b of the control valve 160 rises up to a second predetermined value corresponding with the predetermined value in the clutch control valve 120 of FIG. 2C, the spool 162 is moved down against the line pressure in the chamber 160e so that the fluid circuit $P_{17}$ is connected to the reservoir Re to disengage the low range clutch LC. If the controlled line pressure does not increase up to the second predetermined value, the spool 162 of the control valve 160 is positioned in the upward stroke end thereof to maintain the fluid communication between the fluid circuits $P_2$ and $P_{17}$. This engages the low and high range clutches LC and HC.

When the actual speed ratio e drops below the figure $e_2^*$ under the engagement of the high range clutch HC, the spool 142 of the first valve 140 is moved up due to the increase of the governor pressure from the fluid circuit $P_7$ to connect the fluid circuit $P_{24}$ to the fluid circuit $P_{19}$. Then, the controlled line pressure from the fluid circuit $P_{24}$ is applied to the chamber 160a of the control valve 160 and the chamber 170b of the control valve 170 through the fluid circuit $P_{19}$. Subsequently, when the controlled line pressure increases up to the first predetermined value, the spool 162 of the valve 160 is moved up against biasing of the spring 164 to apply the line pressure to the fluid circuit $P_{17}$ from the fluid circuit $P_2$. This engages the low range clutch LC under the engagement of the high range clutch HC. In this instance, the line pressure is also applied into the chamber 160e of the valve 160 to hold the spool 162 in the upward position, while the line pressure in the chamber 150a of the second valve 150 is discharged by way of the fluid circuit $P_{16a}$. Thereafter, when the controlled line pressure in the chamber 170b of the control valve 170 rises up to the second predetermined value, the spool 172 is moved up against the line pressure in the chamber 170e so that the fluid circuit $P_{16}$ is connected to the reservoir Re to disengage the high range clutch HC.

Figure 9:
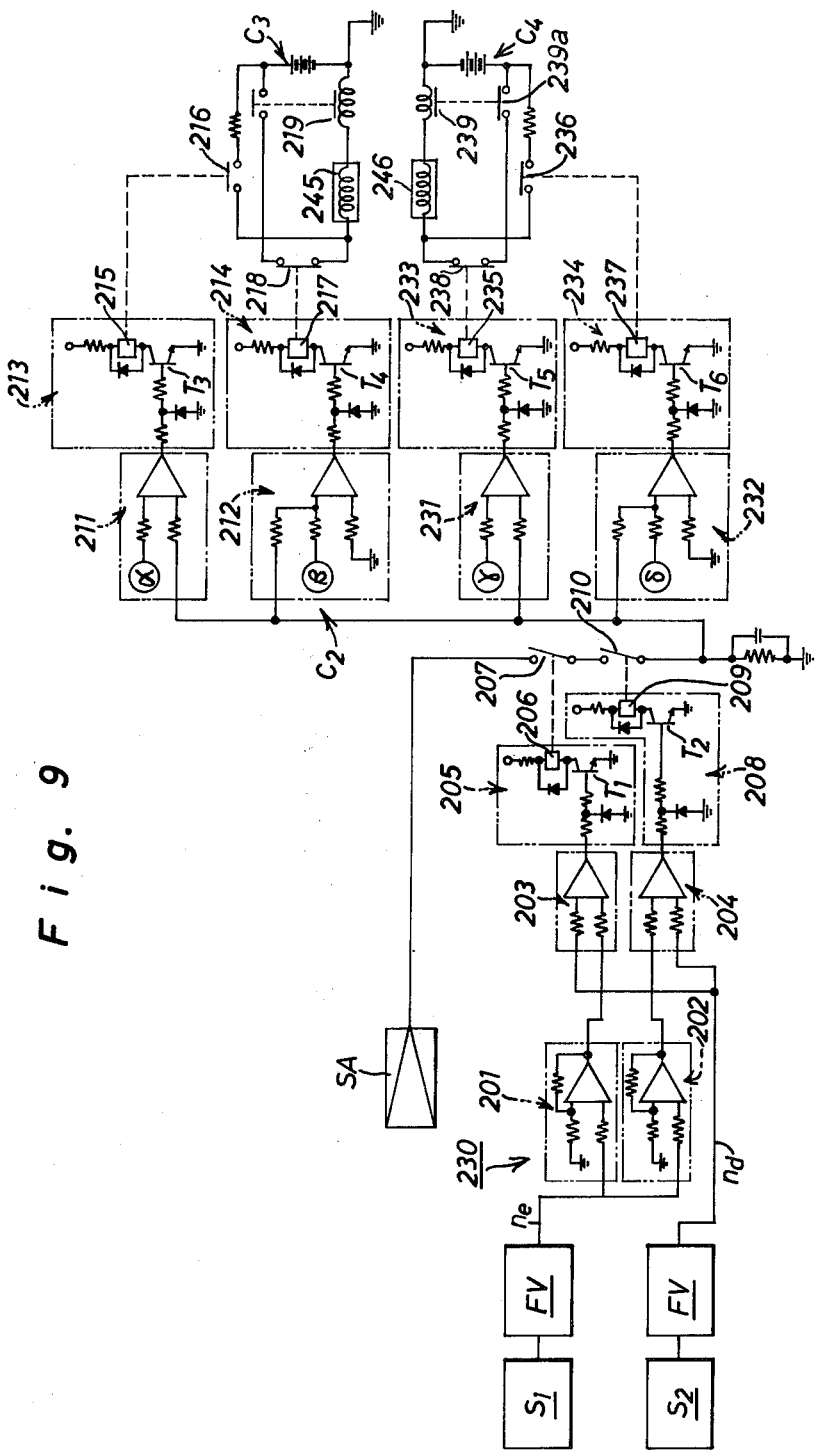
FIG. 9 illustrates an electric control system for operating a modified electrically operated clutch control valve, which corresponds with the clutch control valve shown in FIG. 2C.
Figure 10:
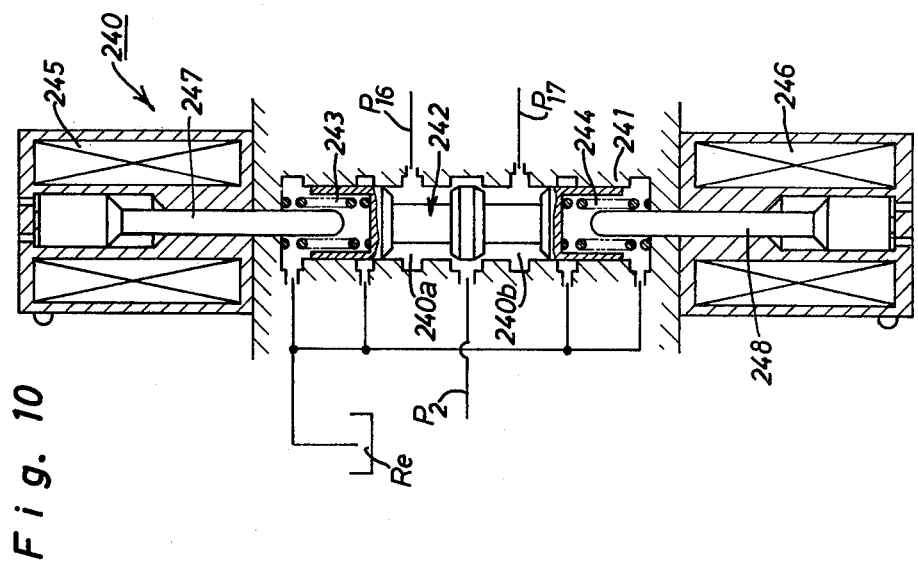
FIG. 10 is a sectional view of the modified clutch control valve.

In FIGS. 9 and 10, there are illustrated an electric control system 230 and a solenoid valve 240 which correspond with the first and second speed ratio detecting valves 140 and 150 and the low and high range clutch control valves 160 and 170 shown in FIG. 8.

In FIG. 10, the solenoid valve 240 comprises a housing 241 with seven ports, a spool 242 with three lands, and a pair of compression springs 243 and 244 engaged with the opposite ends of the spool 242. In the solenoid valve 240, during deenergization of solenoids 245 and 246, the spool 242 is held in the neutral position due to biasing forces of the springs 243 and 244 such that the fluid circuit $P_2$ is connected to the fluid circuit $P_{17}$ through an annular chamber 240b and that the fluid circuit $P_2$ is connected to the fluid circuit $P_{16}$ through an annular chamber 240a. Upon energization of the upper solenoid 245, the spool 242 is moved down by an upper plunger 247 against the lower spring 244. This results in continuous communication between the fluid circuits $P_2$ and $P_{16}$ and disconnection between the fluid circuits $P_2$ and $P_{17}$. Upon energization of the lower solenoid 246, the spool 242 is moved up by a lower plunger 248 against the upper spring 243. This results in continuous communication between the fluid circuits $P_2$ and $P_{17}$ and disconnection between the fluid circuits $P_2$ and $P_{16}$.

In FIG. 9, the electric control system 230 includes the electric control system 200 shown in FIG. 5. The electric control system 230 further includes fifth and sixth comparators 231 and 232 which are respectively connected at their input terminals to the output terminal of the servo-amplifier SA through the contacts 207 and 210. The comparators 231 and 232 are also respectively connected at their output terminals to input terminals of fifth and sixth switching circuits 233 and 234 for a driving circuit $C_4$. The fifth comparator 231 functions to compare a positive voltage from the servo-amplifier SA with an electric signal $\gamma$ of a predetermined value which is smaller than the electric signal $\alpha$ previously described. The sixth comparator 232 functions to compare a negative voltage from the servo-amplifier SA with an electric signal $\delta$ of a predetermined value which is larger than the electric signal $\beta$ previously described. The driving circuit $C_4$ includes the lower solenoid 246 of the solenoid valve 240 in FIG. 10.

With this electric control system 230, when an electric circuit (not shown in the figure) is conducted in response to the start of the engine E, the transistor $T_6$ of the switching circuit 234 is temporarily turned on to energize a reed relay 237 so as to close a normally open contact 236. Then, the lower solenoid 246 is energized to move up the spool 242 of the valve 240 by the lower plunger 248 against the upper spring 243. This results in the continuous communication between the fluid circuits $P_2$ and $P_{17}$ and the disconnection between the fluid circuits $P_{16}$ and $P_2$. In this instance, an electromagnetic relay 239 for the driving circuit $C_4$ is also energized to close a normally open contact 239a. Under this condition, when the line pressure is applied to the fluid circuit $P_2$ from the fluid pump P, the low range clutch LC is instantly engaged by the line pressure applied from the fluid circuits $P_2$ and $P_{17}$.

Subsequently, when the actual speed ratio e rises up in the range between the figures $e_1^*$ and $e_2^*$, the reed relays 206 and 209 of the third and fourth switching circuits 205 and 208 are energized to close the respective contacts 207 and 210 so that the positive voltage from the servo-amplifier SA is applied to the input terminals of the comparators 211 and 231. If the positive signal from the servo-amplifier SA becomes larger than the electric signal $\gamma$, the comparator 231 turns on the transistor $T_5$ to energize a reed relay 235. This opens a normally close contact 238 to deenergize the lower solenoid 246 and the electromagnetic relay 239. Thus, the spool 242 of the valve 240 is returned to its neutral position against the lower spring 244 to connect the fluid circuit $P_2$ to the fluid circuits $P_{16}$ and $P_{17}$. As a result, the high range clutch HC is engaged under the engagement of the low range clutch LC. Furthermore, when the positive voltage from the servo-amplifier SA becomes larger than the electric signal $\alpha$ previously described, the third comparator 211 turns on the transistor $T_3$ of the third switching circuit 213 to energize the reed relay 215 so as to close the contact 216. Then, the upper solenoid 245 is energized to move down the spool 242 so as to connect the fluid circuit $P_2$ to the fluid circuit $P_{16}$ and to disconnect the communication between the fluid circuits $P_2$ and $P_{17}$. As a result, only the high range clutch HC is continuously engaged.

When the actual speed ratio e drops below the figure $e_2^*$ under the engagement of the high range clutch HC, the reed relays 206 and 209 are energized to close the contacts 207 and 210 so that the negative voltage from the servo-amplifier SA is applied to the comparators 212 and 232. If the negative voltage from the servo-amplifier SA becomes larger than the electric signal $\beta$, the comparator 212 turns on the transistor $T_4$ to open the contact 218 so as to deenergize the upper solenoid 245. Then, the spool 242 of the valve 240 is returned to its neutral position to connect the fluid circuit $P_2$ to the fluid circuits $P_{16}$ and $P_{17}$. This engages the low range clutch LC under the engagement of the high range clutch HC. Further, when the negative voltage from the servo-amplifier SA beomes larger than the electric signal $\delta$, the comparator 232 turns on the transistor $T_6$ to close the contact 236. Then, the lower solenoid 246 is energized to move up the spool 242 by the lower plunger 248 against the upper spring 243. This results in the continuous communication between the fluid circuits $P_2$ and $P_{17}$ and the disconnection between the fluid circuits $P_2$ and $P_{16}$ to continuously engage only the low range clutch LC.

In the above embodiment and modification, although the governor valve $G_1$ (or the sensor $S_1$) and the governor valve $G_2$ (or the sensor $S_2$) are mounted on the input and output shafts 2 and 10 to detect the speed ratio e, these may be respectively mounted on the two members of the input and output shafts 2 and 10 and the low and high range clutches LC and HC to detect the speed ratio e.

Although in the above-mentioned embodiment and modification, the present invention is applied to an output split type hydromechanical transmission, the present invention may as well be applied to an input split type hydromechanical transmission and other type transmissions.

Having now fully set forth both structure and operation of preferred embodiments of the concept underlying the present invention, various other embodiments as well as certain variations and modifications of the embodiments herein shown and described will obviously occur to those skilled in the art upon becoming familiar with the underlying concept. It is to be understood, therefore, that with the scope of the appended claims, the invention may be practiced otherwise than as specifically set forth herein.

What is claimed as new and intended to be secured by United States Letters Patent is:

1. A hydromechanical transmission comprising:
an input shaft;
an output shaft;
a hydraulically controlled differential gear unit for selectively providing low and high speed drive power trains between said input and output shafts;
a first positive displacement pump-motor drivingly connected to said input or output shaft;
a second positive displacement pump-motor hydraulically connected with said first pump-motor;
a fluid actuator for controlling the displacement ratio of said first or second pump-motor;
a response valve for controlling line pressure applied to said actuator from a fluid pressure source in accordance with a difference in value between a first signal responsive to a throttle opening angle and a second signal responsive to the rotation speed of said input shaft;
low and high range clutch means operated by the line pressure from said fluid pressure source for switching-over said low speed drive power train to and from said high speed drive power train in response to variation of an actual speed ratio of said output shaft against said input shaft;
speed ratio detecting means for generating a signal therefrom when the actual speed ratio becomes a predetermined value;
clutch control means for selectively operating said low and high range clutch means in response to the signal from said speed ratio detecting means; and
means for conducting the operation of said clutch control means such that said low and high range clutch means are selectively operated only when said difference in value between said first and second signals becomes a predetermined value.

2. A hydromechanical transmission as claimed in claim 1, wherein said clutch control means is a first hydraulically operated valve to be operated in response to the signal from said speed ratio detecting means to selectively apply the line pressure from said fluid pressure source to said low and high range clutch means and said means for conducting the operation of said clutch control means is a second hydraulically operated valve for controlling line pressure applied to said first valve in response to a difference in pressure between a throttle pressure responsive to a throttle opening angle and a governor pressure responsive to the rotation speed of said input shaft such that the operation of said first valve is conducted only when the controlled line pressure becomes a predetermined value.

3. A hydromechanical transmission as claimed in claim 2, wherein said speed ratio detecting means is a third hydraulically operated valve to be operated in response to a difference in pressure between a first governor pressure responsive to the rotation speed of said input shaft and a second governor pressure responsive to the rotation speed of said output shaft to apply the controlled line pressure to said second valve when said difference in pressure between said first and second governor pressures becomes a predetermined value.

4. A hydromechanical transmission as claimed in claim 2, wherein said speed ratio detecting means is third and fourth hydraulically operated values to be respectively operated in response to a difference in pressure between a first governor pressure responsive to the rotation speed of said input shaft and a second governor pressure responsive to the rotation speed of said output shaft to apply the controlled line pressure to said second valve when said difference in pressure between said first and second governor pressures becomes a predetermined value.

5. A hydromechanical transmission as claimed in claim 1, wherein said response valve is an electrically operated valve to be operated by electric energy variable in accordance with a difference in value between a first electric signal responsive to a throttle opening angle and a second electric signal responsive to the rotation speed of said input shaft to control the line pressure applied to said actuator and said clutch control means is an electrically operated valve to be operated by said electric energy applied to said first-named valve in response to the signal from said speed ratio detecting means to selectively apply the line pressure from said fluid pressure source to said low and high range clutch means and wherein said means for conducting the operation of said clutch control means is an electric control circuit for controlling said electric energy applied to said second-named valve such that the operation of said second-named valve is conducted only when said electric energy becomes a predetermined value.

6. A hydromechanical transmission as claimed in claim 5, wherein said speed ratio detecting means is an electric control system operated in response to a difference in value between a first electric signal responsive to the rotation speed of said input shaft and a second electric signal responsive to the rotation speed of said output shaft to apply said electric energy to said second-named valve when said difference in value between said first and second electric signals becomes a predetermined value.

7. A hydromechanical transmission as claimed in claim 1, wherein said speed ratio detecting means is first and second hydraulically operated valves to be respectively operated in response to a difference in pressure between a first governor pressure responsive to the rotation speed of said input shaft and a second governor pressure responsive to the rotation speed of said output shaft to respectively generate a signal therefrom when said difference in pressure becomes a predetermined value, and said clutch control means is third and fourth hydraulically operated valves to be operated in response to respective signals from said first and second valves to selectively apply the line pressure to said low and high range clutch means, and wherein said means for conducting the operation of said clutch control means is a fifth hydraulically operated valve for controlling line pressure applied to said third and fourth valves in response to a difference in pressure between a throttle pressure responsive to a throttle opening angle and a governor pressure responsive to the rotation speed of said input shaft such that each operation of said third and fourth valves is selectively conducted only when the controlled line pressure becomes a predetermined value.

* * * * *